US012168357B2

(12) United States Patent
Yoshida

(10) Patent No.: US 12,168,357 B2
(45) Date of Patent: Dec. 17, 2024

(54) LIQUID DISCHARGE APPARATUS, CONTROL METHOD THEREFOR, AND MEDIUM

(71) Applicant: BROTHER KOGYO KABUSHIKI KAISHA, Nagoya (JP)

(72) Inventor: Yasunari Yoshida, Ama (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 142 days.

(21) Appl. No.: 18/065,752

(22) Filed: Dec. 14, 2022

(65) Prior Publication Data

US 2023/0202194 A1 Jun. 29, 2023

(30) Foreign Application Priority Data

Dec. 28, 2021 (JP) ................................ 2021-214165

(51) Int. Cl.
*B41J 2/045* (2006.01)
*B41J 2/165* (2006.01)
*B41J 2/21* (2006.01)

(52) U.S. Cl.
CPC ........... *B41J 2/2139* (2013.01); *B41J 2/0451* (2013.01); *B41J 2/16579* (2013.01)

(58) Field of Classification Search
CPC .. B41J 2/0451; B41J 2/04586; B41J 2/16579; B41J 2/2139
See application file for complete search history.

(56) References Cited

U.S. PATENT DOCUMENTS

2008/0266345 A1* 10/2008 Onodera ................ B41J 2/2139 347/14
2009/0066743 A1* 3/2009 Komatsu .............. B41J 2/16508 347/14
2010/0060690 A1* 3/2010 Hosokawa ............. B41J 2/0451 347/14
2014/0085369 A1* 3/2014 Allworth .............. B41J 2/16579 347/14
2018/0093472 A1 4/2018 Yoshida

FOREIGN PATENT DOCUMENTS

JP 2016179552 A 10/2016
JP 2018052051 A 4/2018

* cited by examiner

*Primary Examiner* — Anh T Vo
(74) *Attorney, Agent, or Firm* — Scully, Scott, Murphy & Presser, PC

(57) ABSTRACT

There is provided a liquid discharge apparatus including: a head having nozzles; a conveyer; and a controller. The controller is configured to carry out a conveyance process of conveying a recording medium in a conveyance direction, and a discharge process of discharging a liquid from the nozzles to the recording medium. The discharge process includes a plurality of discharge steps carried out to a unit area of the recording medium based on data obtained by decomposing an image data into complementary patterns. In at least one of the discharge steps corresponding to the unit area, a function of a discharge duty of the nozzles has an ascending portion or a descending portion. The controller is configured to carry out before the discharge process: a detection process of detecting a defect nozzle in the nozzles; and in a case that the defect nozzle is detected, a change process of changing the function.

17 Claims, 16 Drawing Sheets

LIQUID DISCHARGE APPARATUS, CONTROL METHOD THEREFOR, AND MEDIUM

REFERENCE TO RELATED APPLICATIONS

This application claims priority from Japanese Patent Application No. 2021-214165 filed on Dec. 28, 2021. The entire content of the priority application is incorporated herein by reference.

BACKGROUND ART

There are known printers (liquid discharge apparatuses) printing an image by repetitively carrying out a formation process (a discharge process) of discharging an ink to a recording medium according to an image data to form dots, and a conveyance process of conveying the recording medium. Further, there is known an aspect of overlapping at least a part of a first scanning range, on the recording medium, scanned by a printing head in a first formation process with at least a part of a second scanning range, on the recording medium, scanned by the printing head in a second formation process. A function of a recording ratio (discharge duty) of a nozzle to the position of the nozzle in a conveyance direction may be composed of a flat central portion, such an upstream portion to the central portion in the conveyance direction as to decrease from 50% to zero % linearly toward the −Y direction with respect to a change of the nozzle position in the conveyance direction (an ascending portion gradually increasing from upstream to downstream in the conveyance direction), and such a downstream portion from the central portion in the conveyance direction as to decrease from 50% to zero % linearly toward the +Y direction with respect to the change of the nozzle position in the conveyance direction (a descending portion gradually decreasing from upstream to downstream in the conveyance direction).

DESCRIPTION

In the liquid discharge apparatus, if there is any "defect nozzle" among a plurality of nozzles, then the defect nozzle cannot land the liquid appropriately on the area to which the liquid should have been discharged, such that dot absence may occur. The "defect nozzle" refers to a nozzle which does not discharge the liquid, a nozzle of which discharge amount is decreased from a prescribed amount, and a nozzle which discharges the liquid so that the liquid is landed on a position deviated from a designed position, due to clog of the nozzle caused, for example, by an increase of the liquid viscosity.

In the case of carrying out the discharge process as described in Japanese Patent Application Laid-open No. 2018-52051, in order to prevent dot absence due to the defect nozzle, it is conceivable to complement the image by way of raising the discharge duty of another nozzle corresponding to the position of the defect nozzle in another discharge step than the discharge step to which the defect nozzle belongs among a plurality of discharge steps corresponding to a unit area. However, according to this method, if the conveying distance and/or landing position deviate(s), then the other nozzle cannot complement the image, such that the dot absence (and furthermore a banding) will still be caused.

An object of the present disclosure is to provide a liquid discharge apparatus, a control method therefor, and a medium capable of preventing dot absence due to the defect nozzle even if deviation occurs in the conveying distance and/or landing position.

Note that with a defect nozzle being detected, it is conceivable to change the aforementioned function without simply raising the discharge duty of another nozzle corresponding to the position of the defect nozzle. However, if the function is changed uniformly regardless of whether the defect nozzle belonging to a chevron portion or a base portion of the function, then deterioration in image quality and/or complication in process may arise.

Another object of the present disclosure is to provide a liquid discharge apparatus, a control method therefor, and a medium capable of preventing dot absence due to the defect nozzle even if deviation occurs in the conveying distance and/or landing position, and capable of preventing deterioration in image quality and/or complication in process.

According to a first aspect of the present disclosure, there is provided a liquid discharge apparatus including:

- a head having a plurality of nozzles;
- a conveyer configured to convey a recording medium in a conveyance direction; and
- a controller, wherein:
- the plurality of nozzles is distanced from each other in the conveyance direction;
- the controller is configured to carry out, based on an image date, a conveyance process of conveying the recording medium in the conveyance direction by the conveyer, and a discharge process of discharging a liquid from the plurality of nozzles to the recording medium;
- the discharge process includes a plurality of discharge steps to be carried out to a unit area of the recording medium with a time interval to discharge the liquid selectively from the plurality of nozzles based on data obtained by decomposing the image data into complementary patterns;
- in at least one of the plurality of discharge steps corresponding to the unit area, a function of a discharge duty of the nozzles with respect to positions of the nozzles in the conveyance direction has an ascending portion gradually increasing from upstream to downstream in the conveyance direction or a descending portion gradually decreasing from upstream to downstream in the conveyance direction;
- in an area including a plurality of pieces of the unit area adjacent to each other in the conveyance direction, the function is composed at least of the ascending portion and the descending portion; and
- the controller is configured to carry out before carrying out the discharge process:
- a detection process of detecting a defect nozzle in the plurality of nozzles; and
- in a case that the defect nozzle is detected in the detection process, a change process of changing the function.

According to a second aspect of the present disclosure, there is provided a control method for controlling a liquid discharge apparatus including a head having a plurality of nozzles, and a conveyer configured to convey a recording medium in a conveyance direction, the plurality of nozzles being distanced from each other in the conveyance direction, the control method including:

- conveying the recording medium in the conveyance direction by the conveyer based on an image data; and
- discharging a liquid to the recording medium from the plurality of nozzles based on the image data, wherein:

the discharging of the liquid includes a plurality of discharge steps to be carried out to a unit area of the recording medium with a time interval to discharge the liquid selectively from the plurality of nozzles based on data obtained by decomposing the image data into complementary patterns;

in at least one of the plurality of discharge steps corresponding to the unit area, a function of a discharge duty of the nozzles with respect to positions of the nozzles in the conveyance direction has an ascending portion gradually increasing from upstream to downstream in the conveyance direction or a descending portion gradually decreasing from upstream to downstream in the conveyance direction; and in an area including a plurality of pieces of the unit area adjacent to each other in the conveyance direction, the function is composed at least of the ascending portion and the descending portion, the control method further comprising:

detecting a defect nozzle in the plurality of nozzles, before the discharging of the liquid; and in a case that the defect nozzle is detected in the detecting of the defect nozzle, changing the function before the discharging of the liquid.

According to a third aspect of the present disclosure, there is provided a non-transitory and computer readable medium storing a program capable of being executed by a controller of a liquid discharge apparatus, the liquid discharge apparatus including a head having a plurality of nozzles, and a conveyer configured to convey a recording medium in a conveyance direction, the plurality of nozzles being distanced from each other in the conveyance direction, the program being configured to cause the controller to carry out based on an image data:

a conveyance process of conveying the recording medium in the conveyance direction by the conveyer; and a discharge process of discharging a liquid from the plurality of nozzles to the recording medium, wherein:

the discharge process includes a plurality of discharge steps to be carried out to a unit area of the recording medium with a time interval to discharge the liquid selectively from the plurality of nozzles based on data obtained by decomposing the image data into complementary patterns;

in at least one of the plurality of discharge steps corresponding to the unit area, a function of a discharge duty of the nozzles with respect to positions of the nozzles in the conveyance direction has an ascending portion gradually increasing from upstream to downstream in the conveyance direction or a descending portion gradually decreasing from upstream to downstream in the conveyance direction; and in an area including a plurality of pieces of the unit area adjacent to each other in the conveyance direction, the function is composed at least of the ascending portion and the descending portion, the program is further configured to cause the controller to carry out before carrying out the discharge process:

a detection process of detecting a defect nozzle in the plurality of nozzles; and in a case that the defect nozzle is detected in the detection process, a change process of changing the function.

According to the present disclosure, if a defect nozzle is detected, then the function is changed without simply raising the discharge duty of another nozzle corresponding to the position of the defect nozzle. Therefore, it is possible to prevent dot absence due to the defect nozzle even if deviation occurs in the conveying distance and/or landing position. Further, in the change process, by varying the function depending on whether the defect nozzle belongs to a chevron portion or a base portion of the function, it is possible to prevent deterioration in image quality and/or complication in process.

Figure 4A:
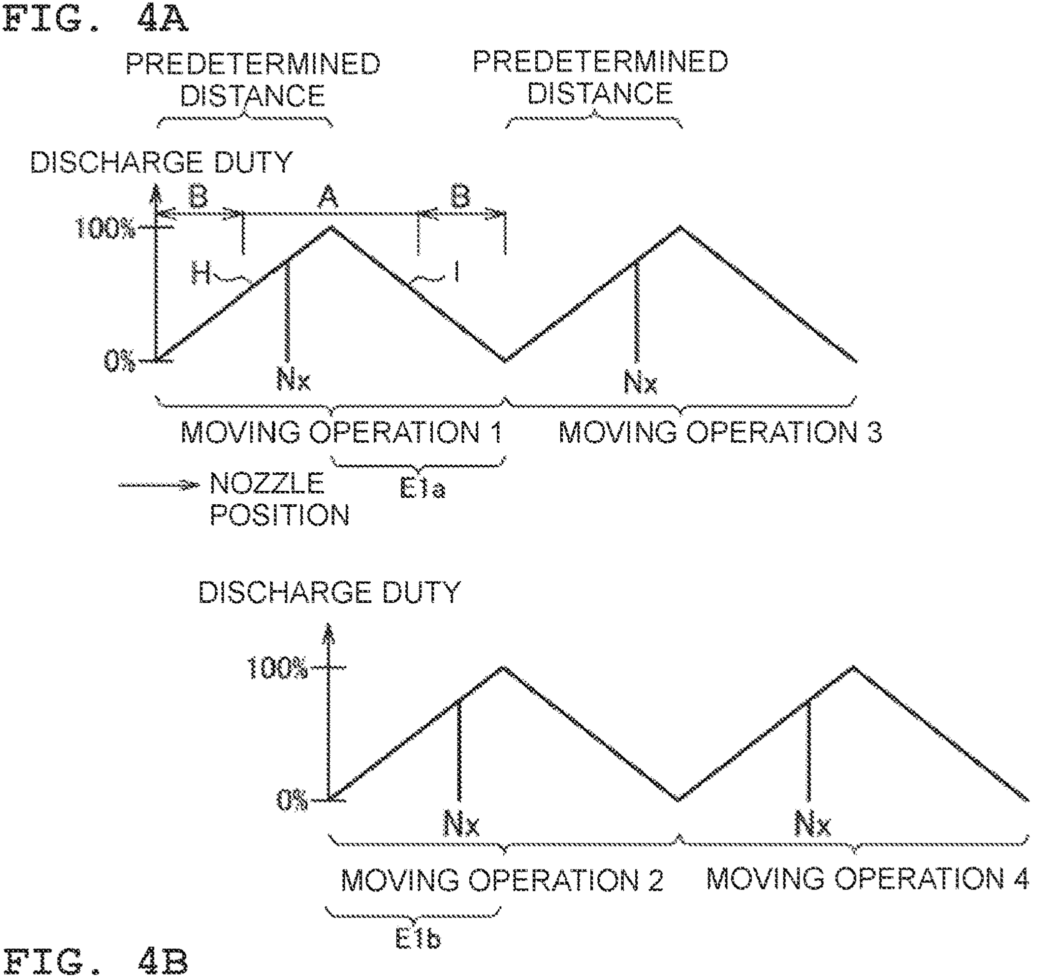
Figure 4B:
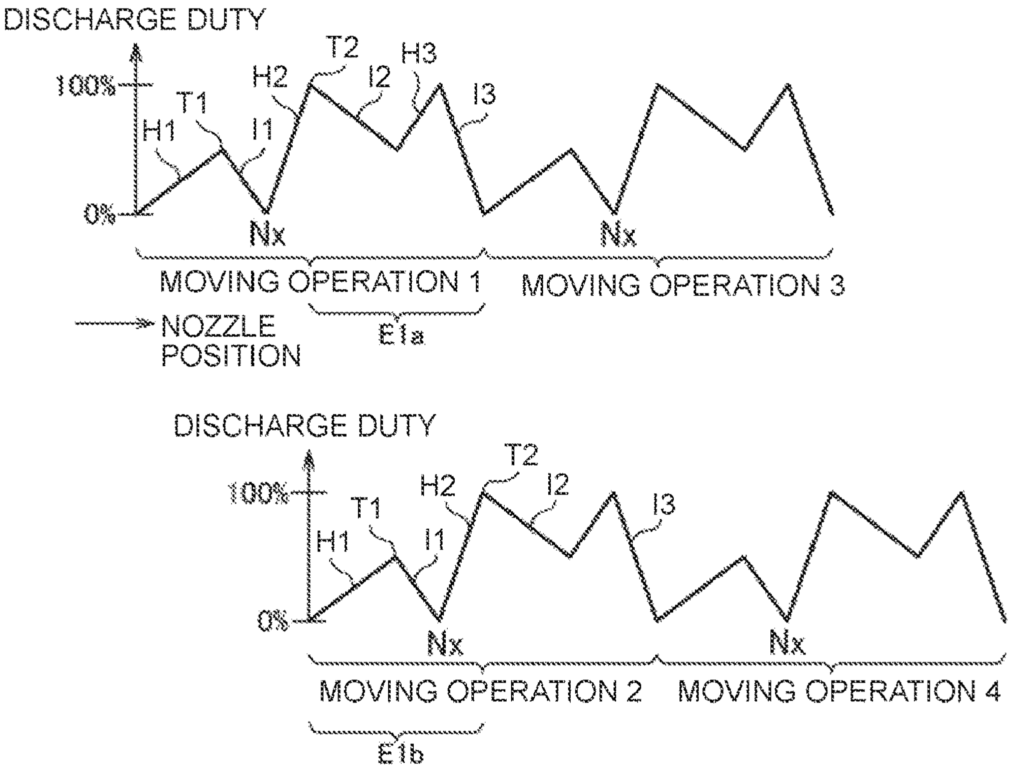

FIGS. 4A and 4B are graphs depicting a function of discharge duty of nozzles to nozzle positions in a conveyance direction when a recording is carried out by two moving operations to a unit area of a paper. FIG. 4A is a graph depicting the case where a defect nozzle belongs to a chevron portion of the function, and FIG. 4B is a graph depicting a function obtained by changing the function of FIG. 4A.

Figure 5A:
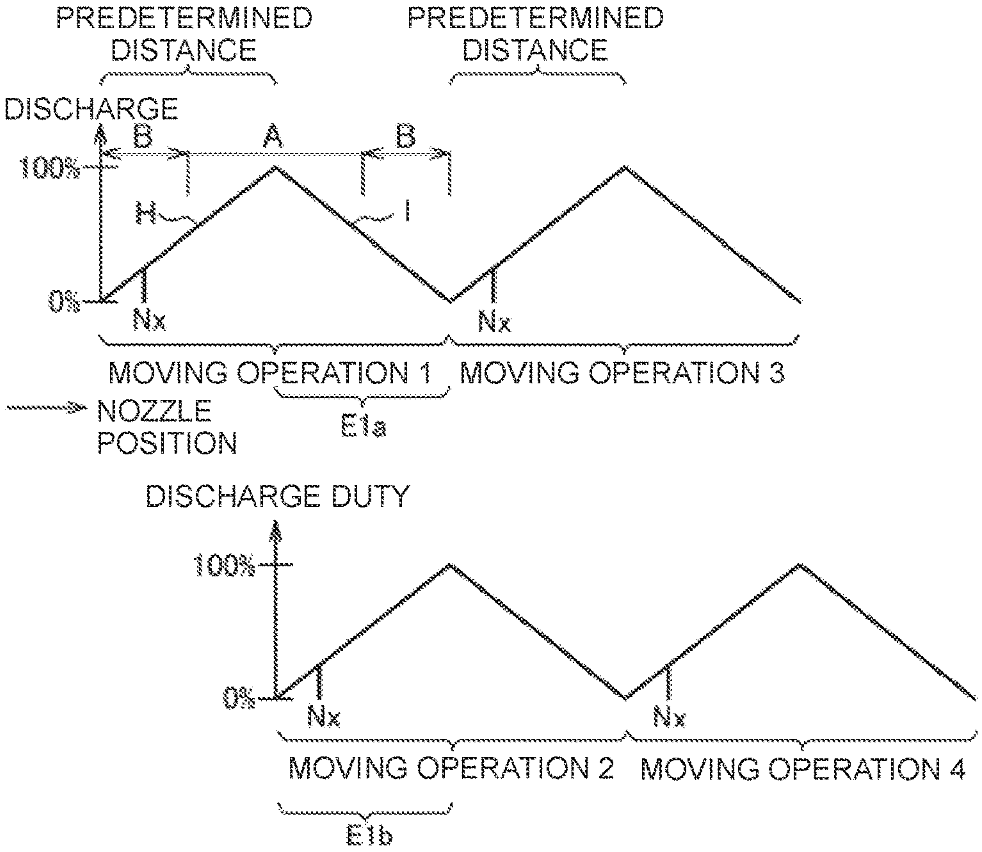
Figure 5B:
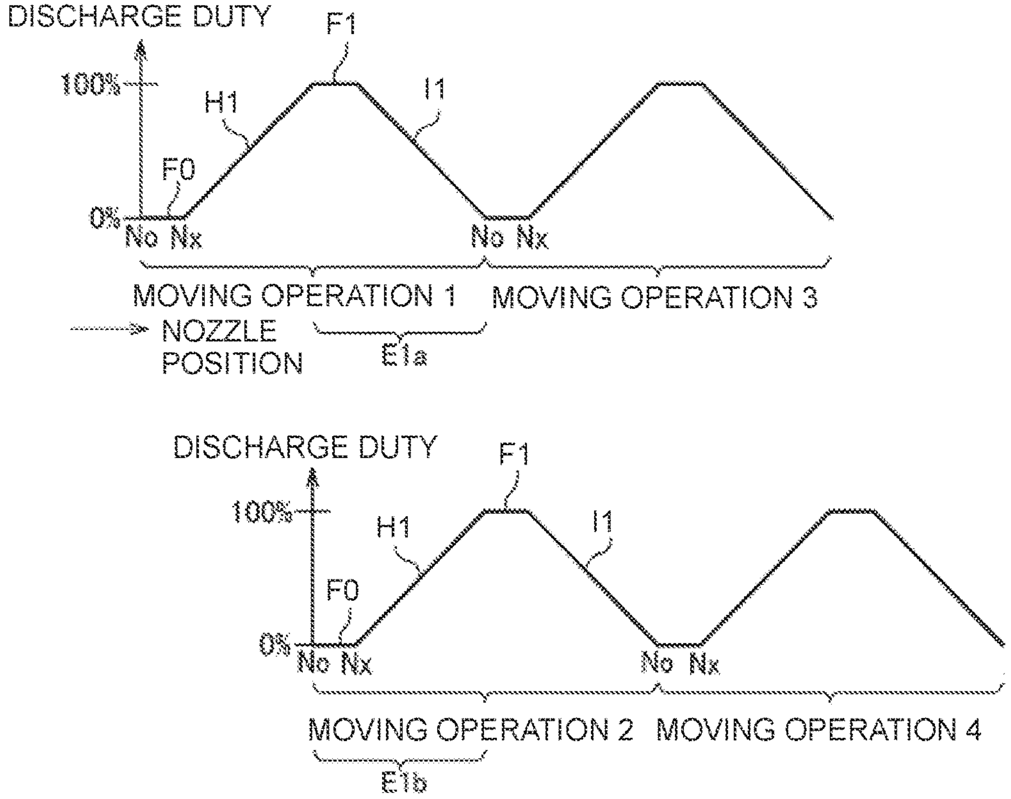

FIGS. 5A and 5B are graphs depicting the function of discharge duty of nozzles to nozzle positions in the conveyance direction when a recording is carried out by two moving operations to a unit area of a paper. FIG. 5A is a graph depicting the case where a defect nozzle belongs to a base portion of the function, and FIG. 5B is a graph depicting a function obtained by changing the function of FIG. 5A.

Figure 6A:
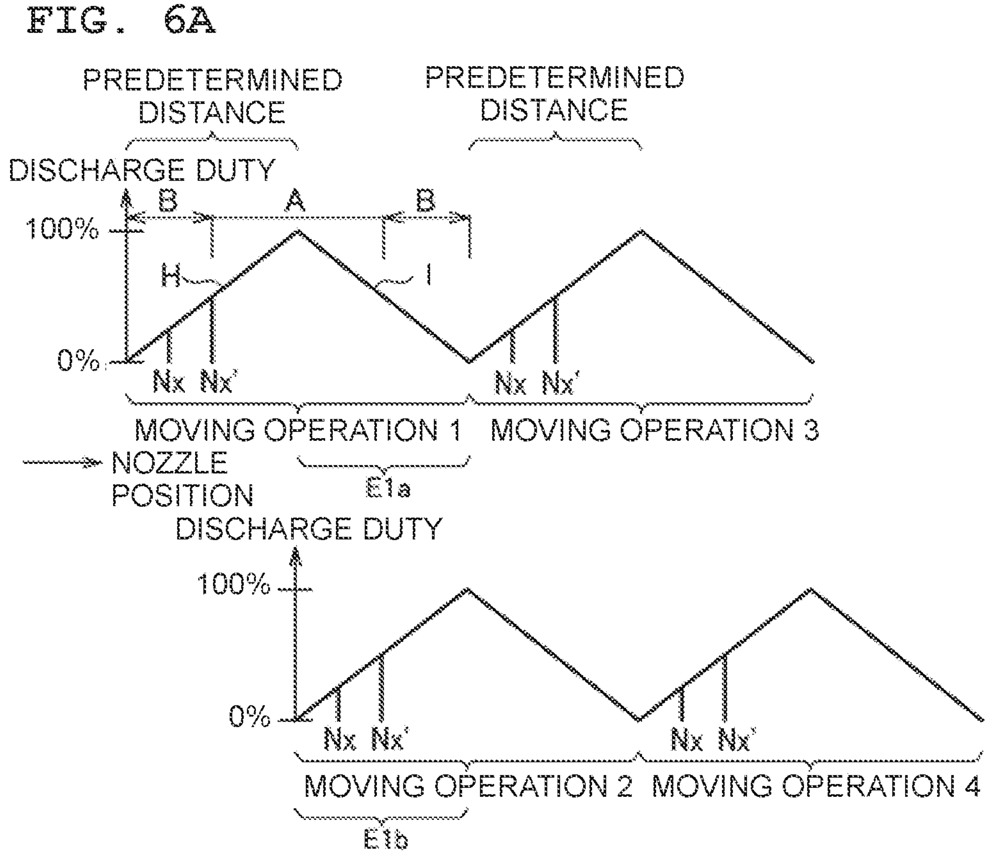
Figure 6B:
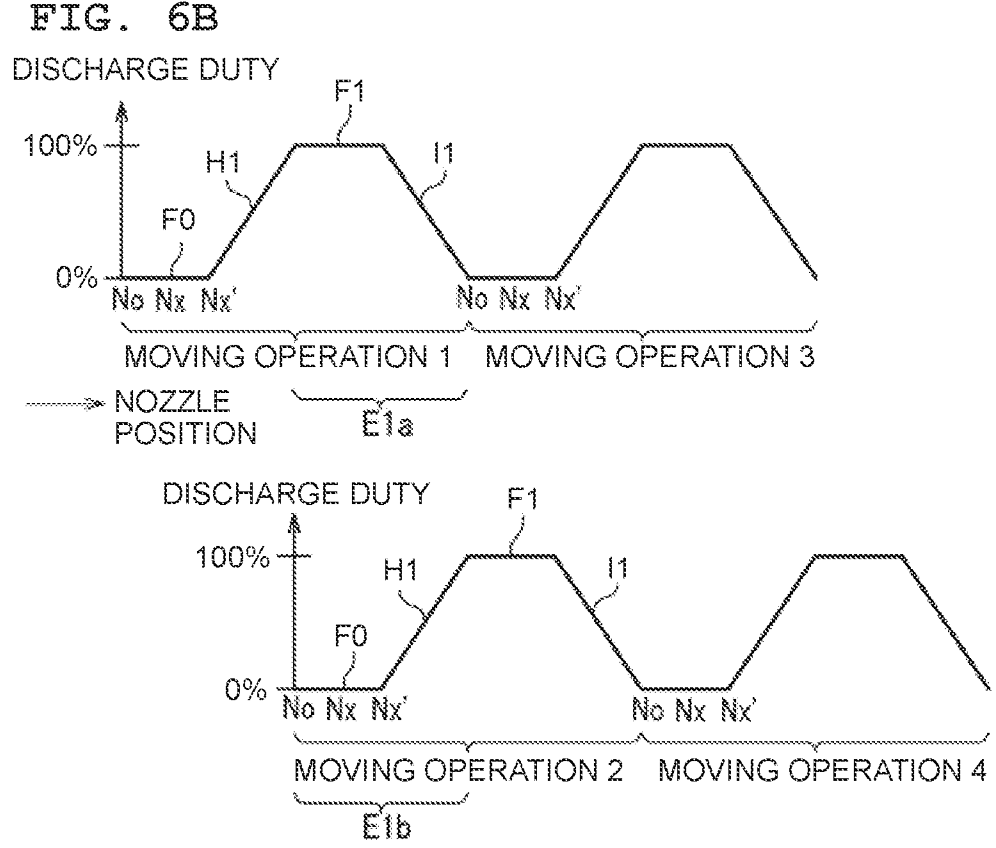

FIGS. 6A and 6B are graphs depicting the function of discharge duty of nozzles to nozzle positions in the conveyance direction when a recording is carried out by two moving operations to a unit area of a paper. FIG. 6A is a graph depicting the case where two defect nozzles belong to a base portion of the function, and FIG. 6B is a graph depicting a function obtained by changing the function of FIG. 6A.

Figure 7A:
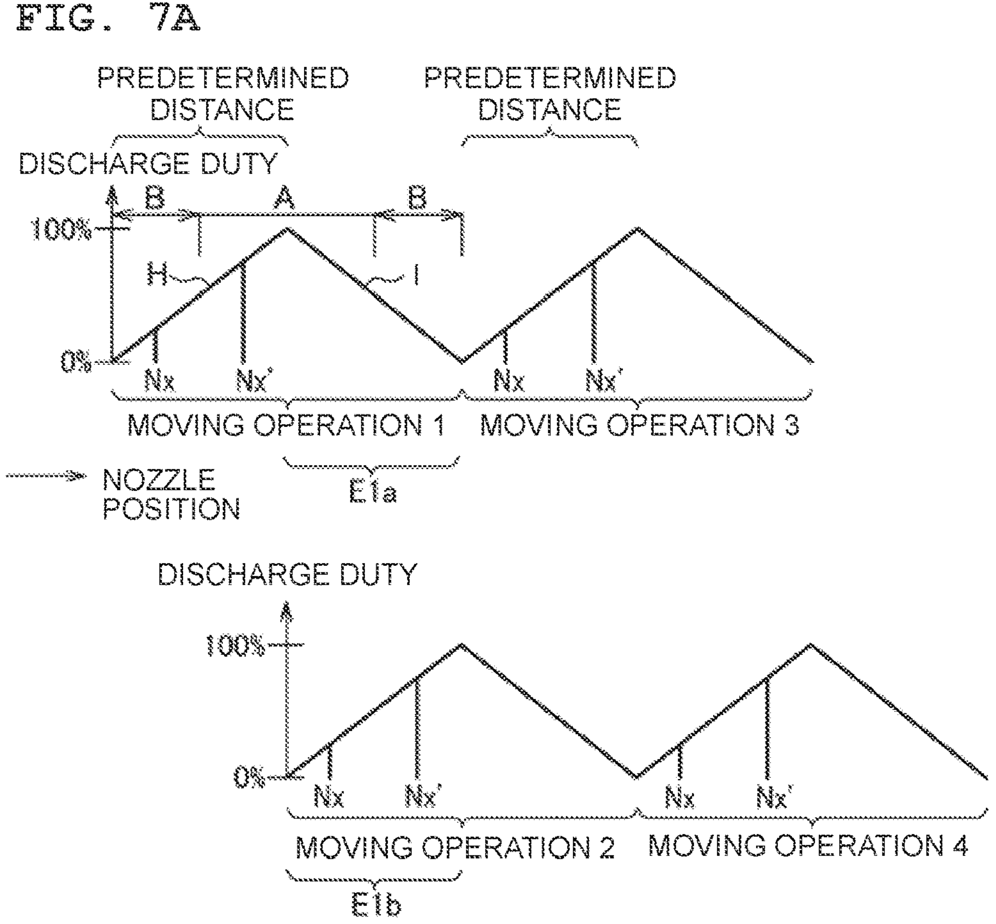
Figure 7B:
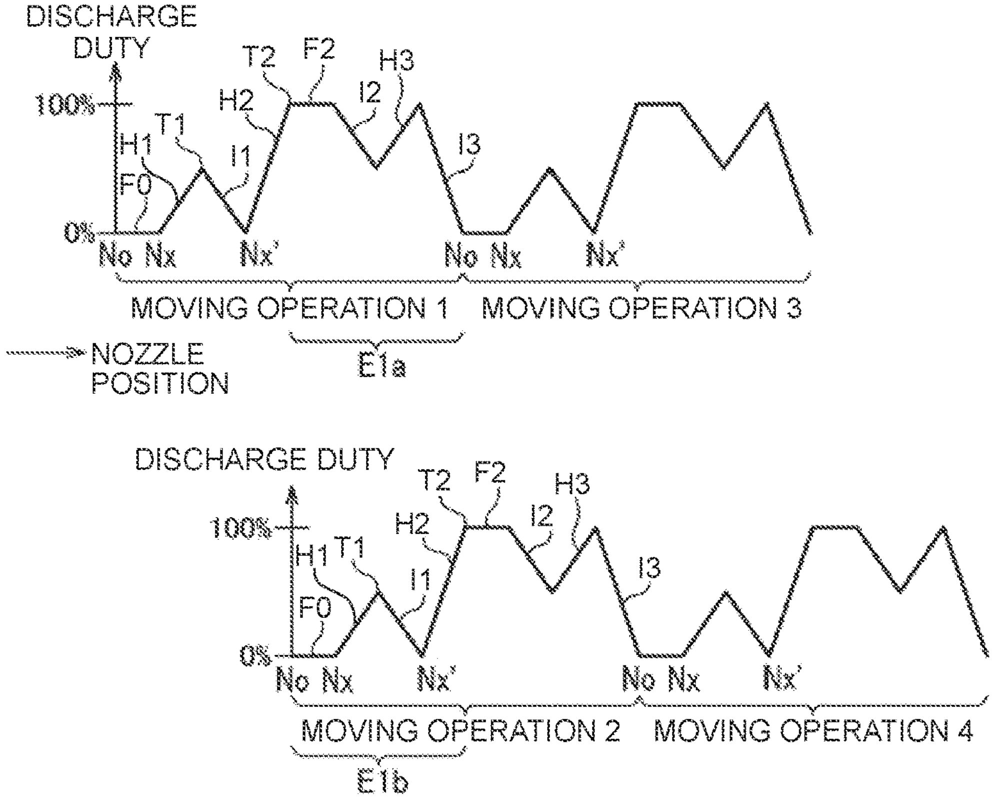

FIGS. 7A and 7B are graphs depicting the function of discharge duty of nozzles to nozzle positions in the conveyance direction when a recording is carried out by two moving operations to a unit area of a paper. FIG. 7A is a graph depicting the case where defect nozzles belong respectively to the chevron portion and a base portion of the function, and FIG. 7B is a graph depicting a function obtained by changing the function of FIG. 7A.

Figure 8A:
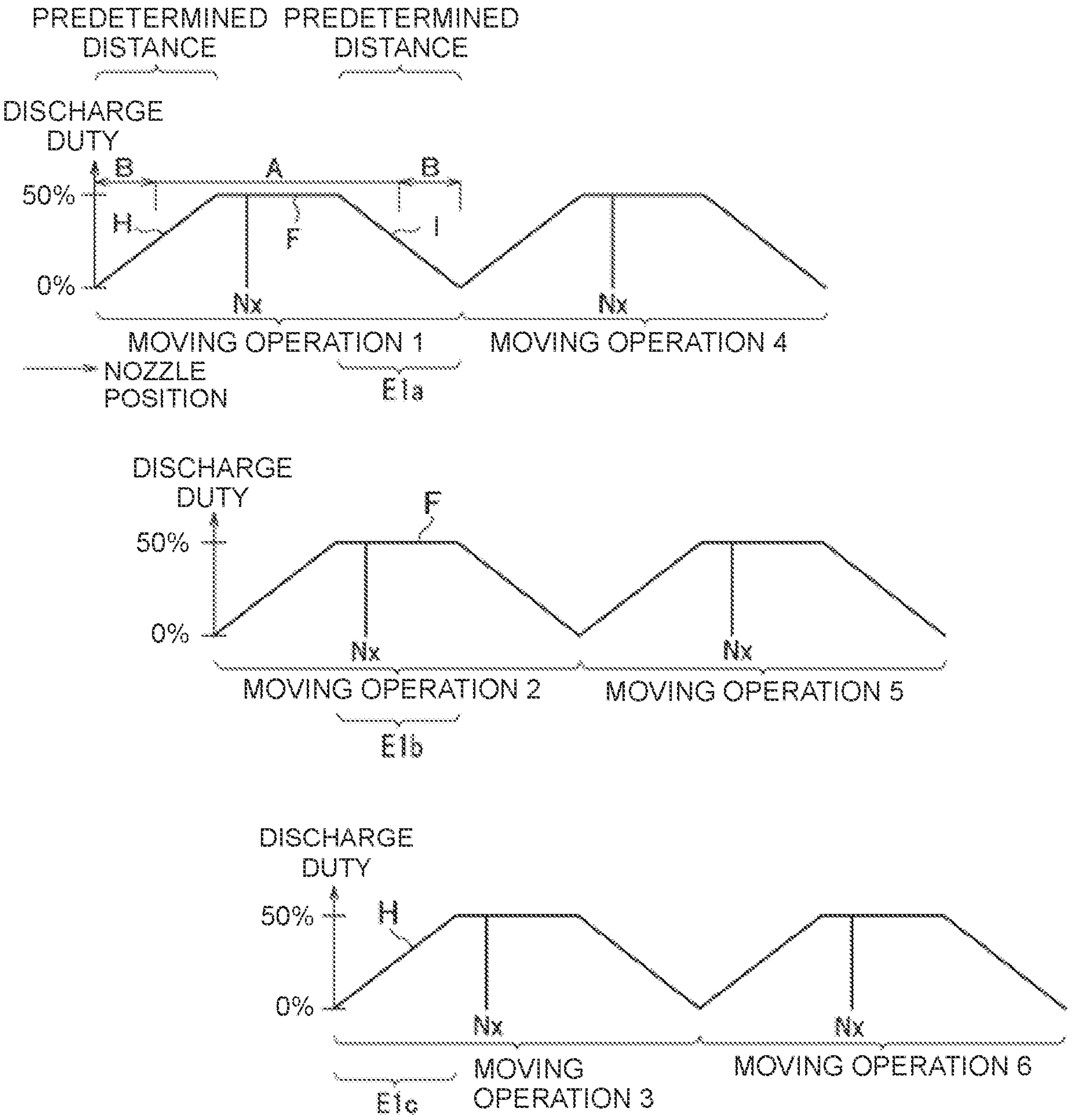
Figure 8B:
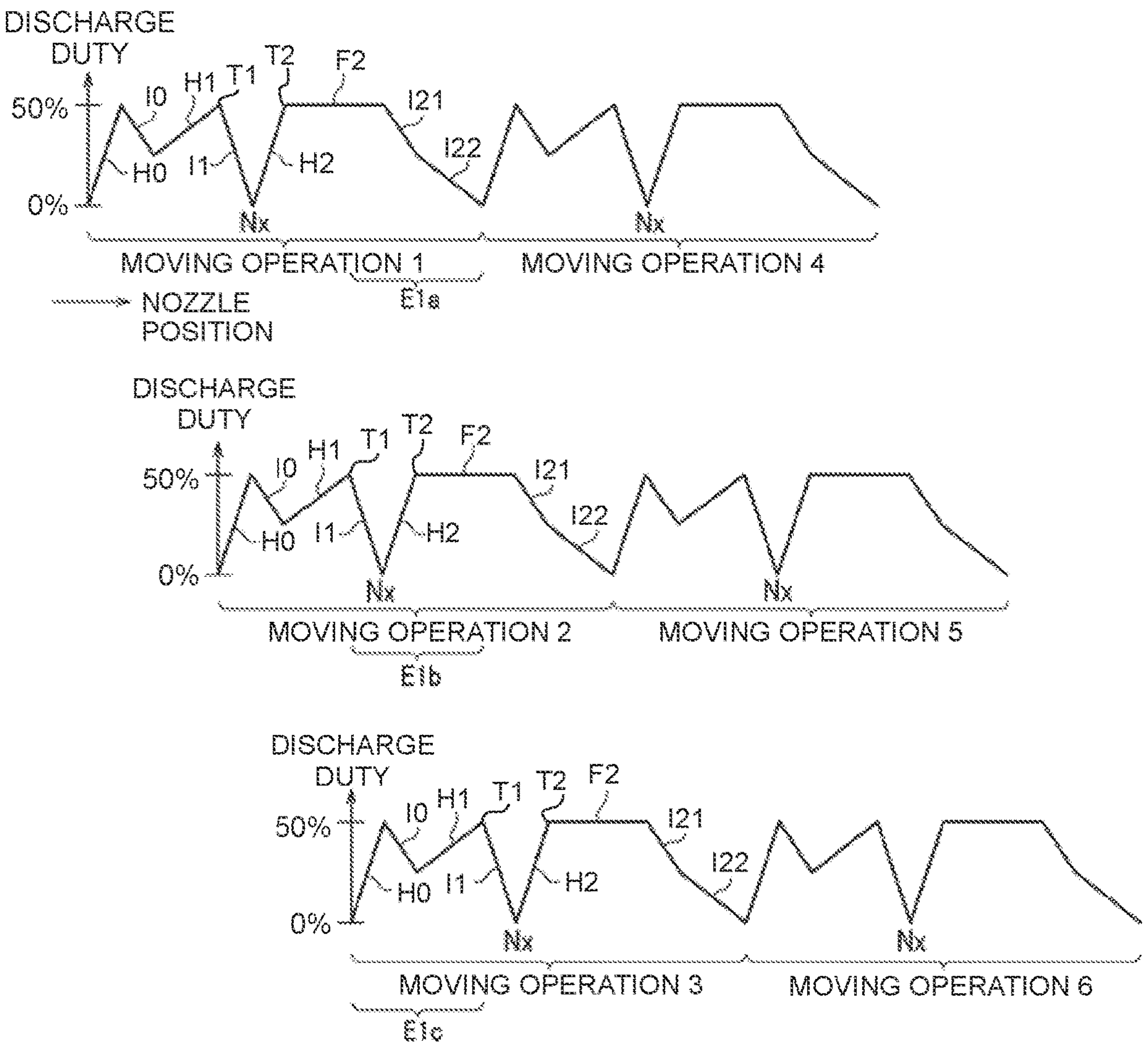

FIGS. 8A and 8B are graphs depicting a function of discharge duty of nozzles to nozzle positions in the conveyance direction when a recording is carried out by three moving operations to a unit area of a paper. FIG. 8A is a graph depicting the case where a defect nozzle belongs to a chevron portion of the function, and FIG. 8B is a graph depicting a function obtained by changing the function of FIG. 8A.

Figure 9A:
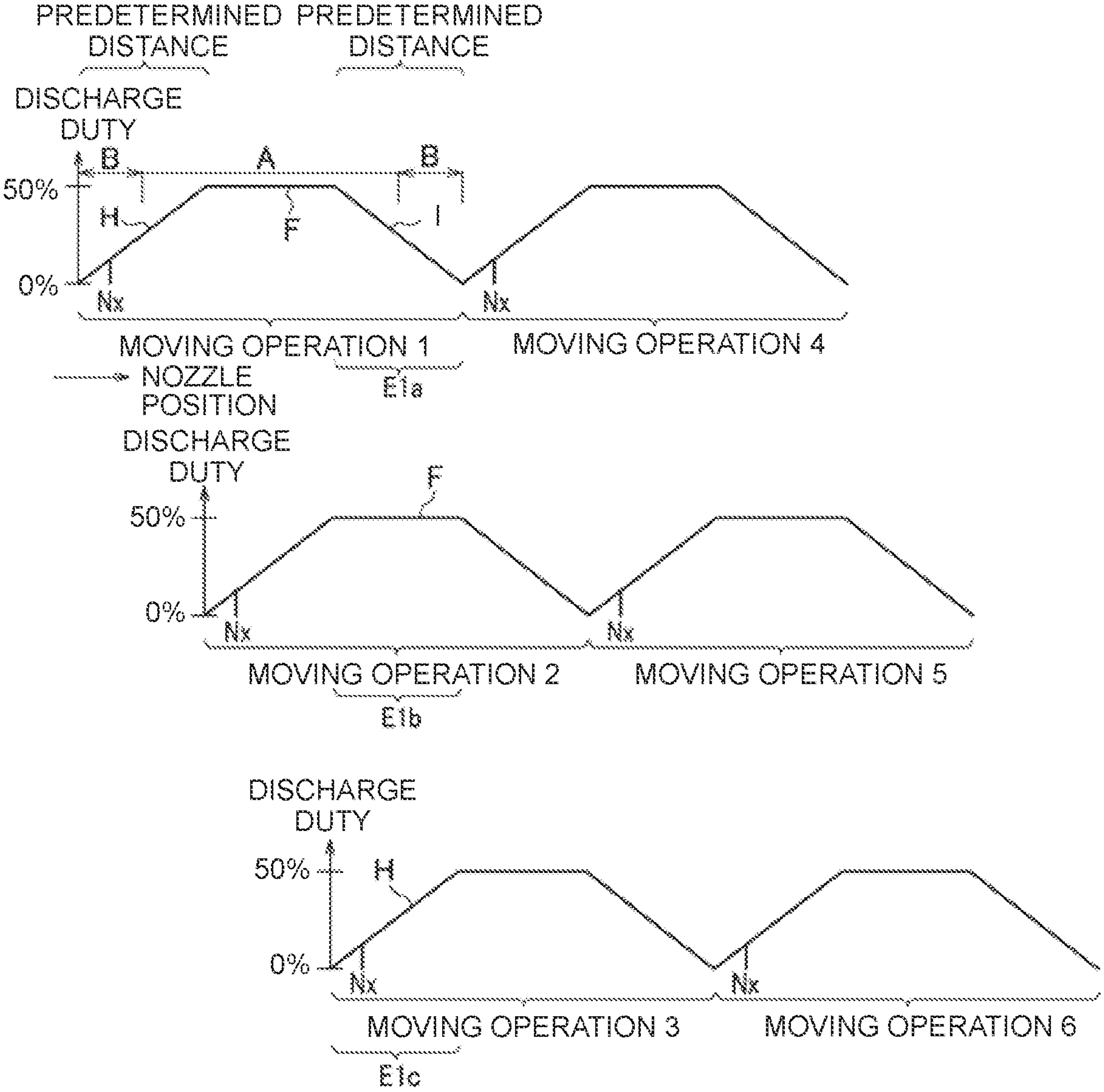
Figure 9B:
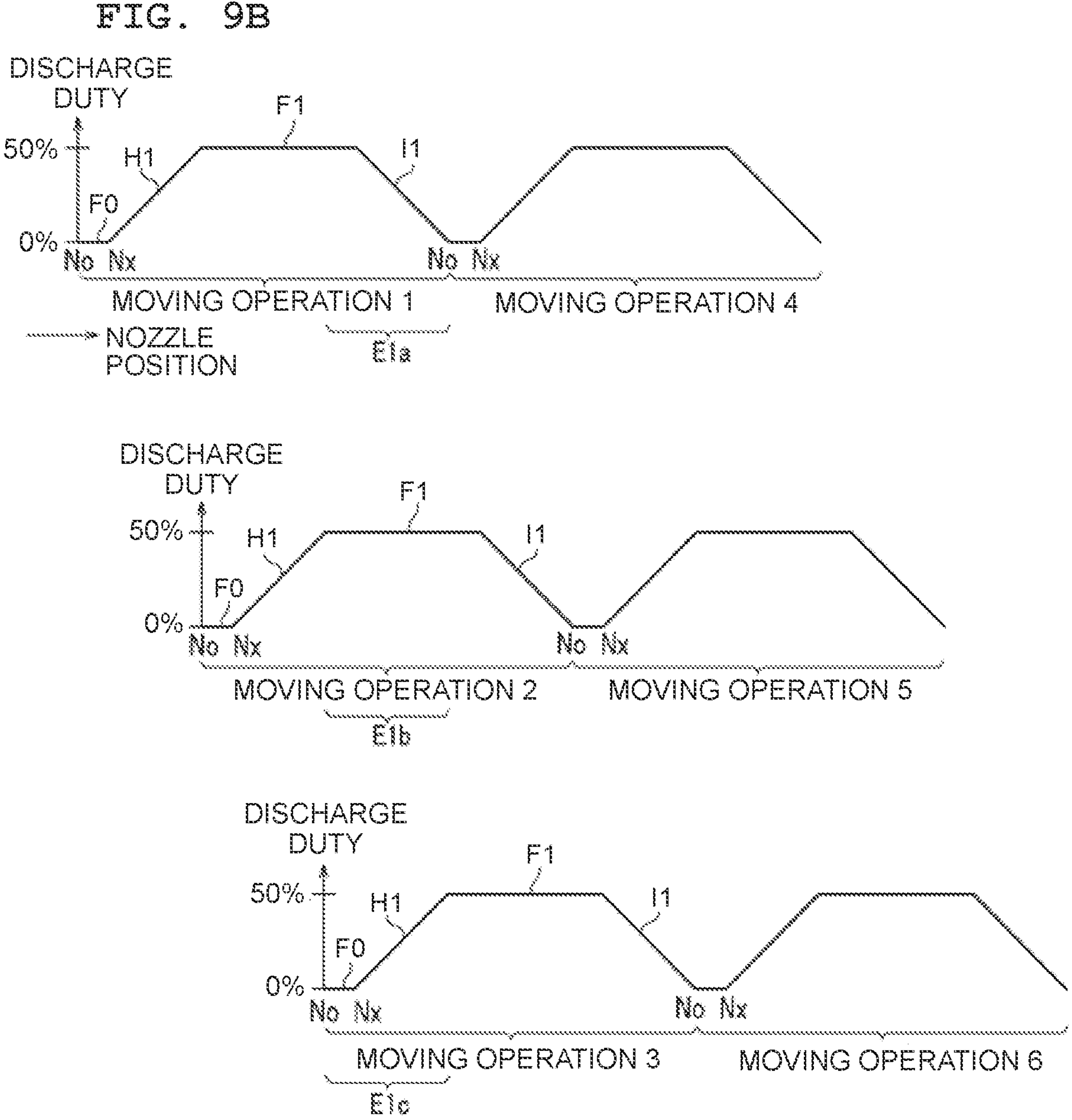

FIGS. 9A and 9B are graphs depicting the function of discharge duty of nozzles to nozzle positions in the conveyance direction when a recording is carried out by three moving operations to a unit area of a paper. FIG. 9A is a graph depicting the case where a defect nozzle belongs to a base portion of the function, and FIG. 9B is a graph depicting a function obtained by changing the function of FIG. 9A.

Figure 10A:
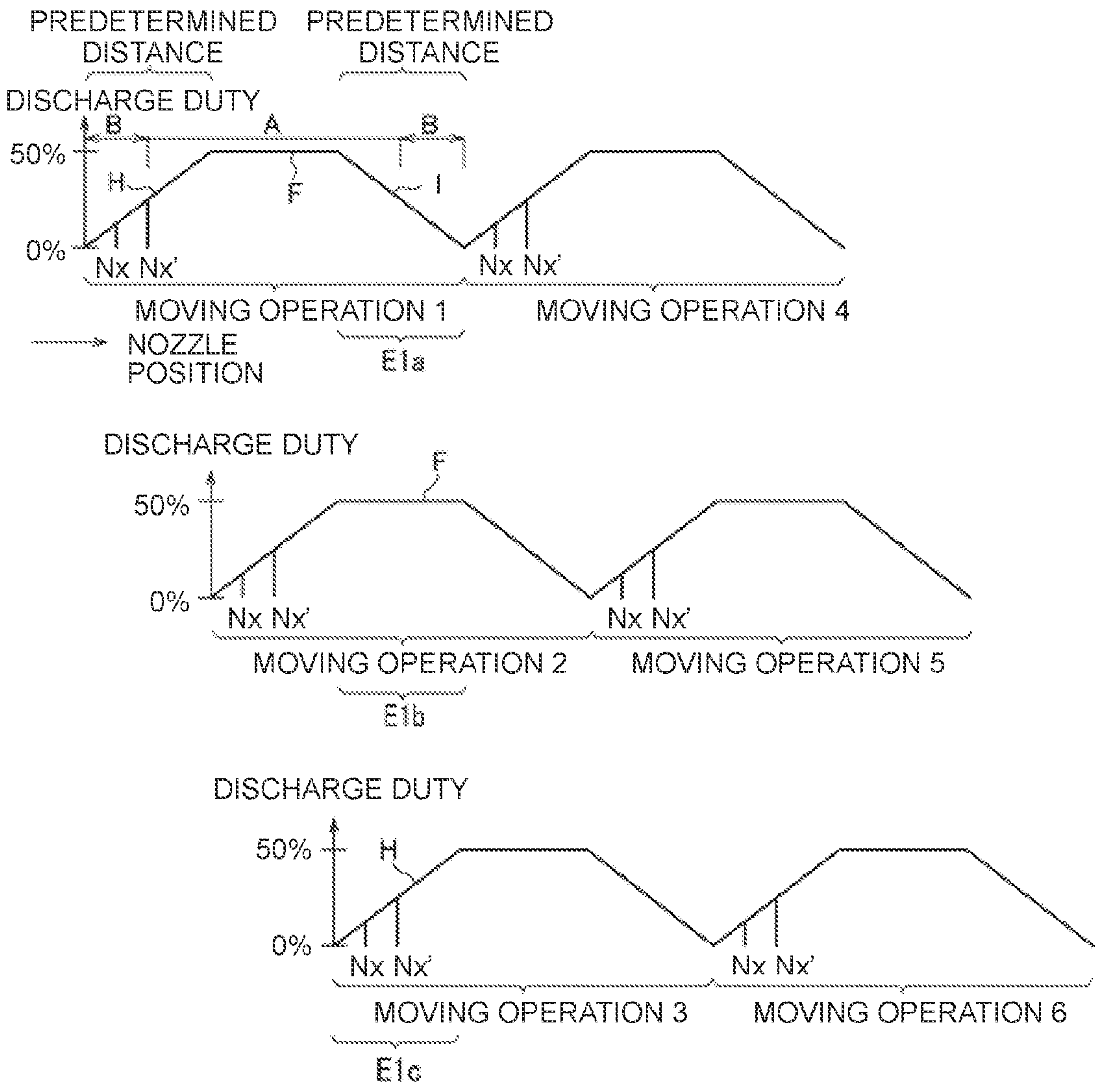
Figure 10B:
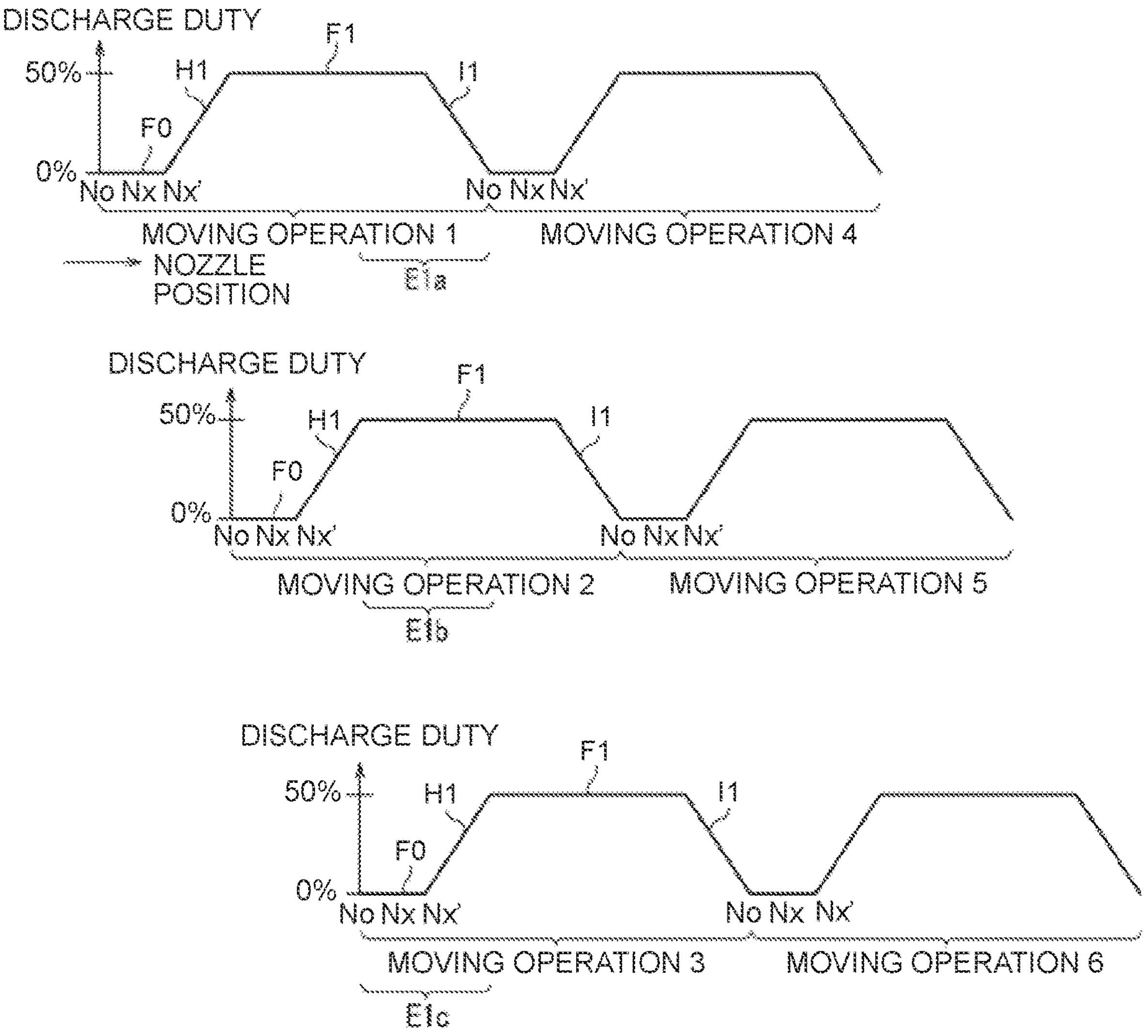

FIGS. 10A and 10B are graphs depicting the function of discharge duty of nozzles to nozzle positions in the conveyance direction when a recording is carried out by three moving operations to a unit area of a paper. FIG. 10A is a graph depicting the case where two defect nozzles belong to a base portion of the function, and FIG. 10B is a graph depicting a function obtained by changing the function of FIG. 10A.

Figure 11A:
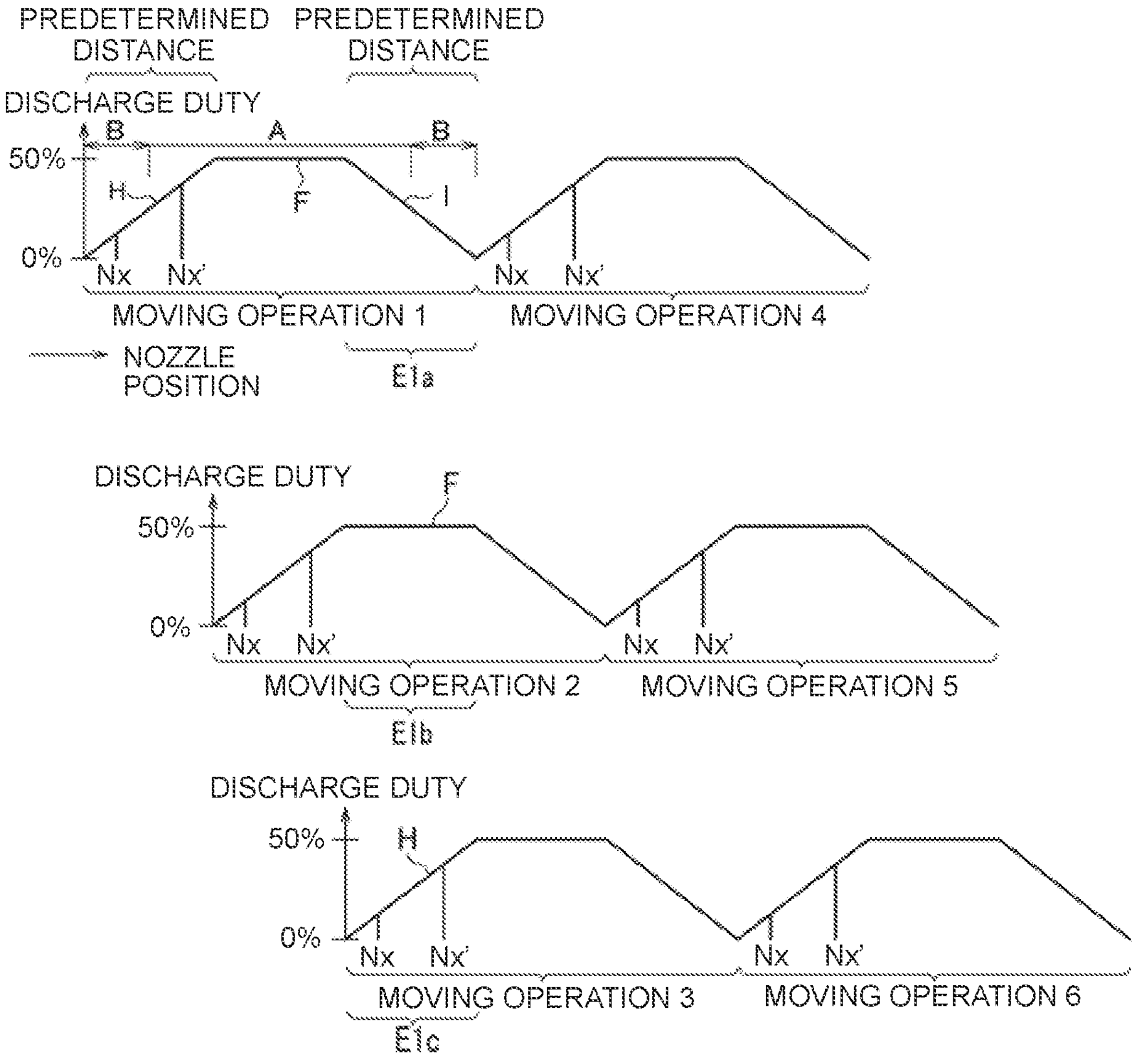
Figure 11B:
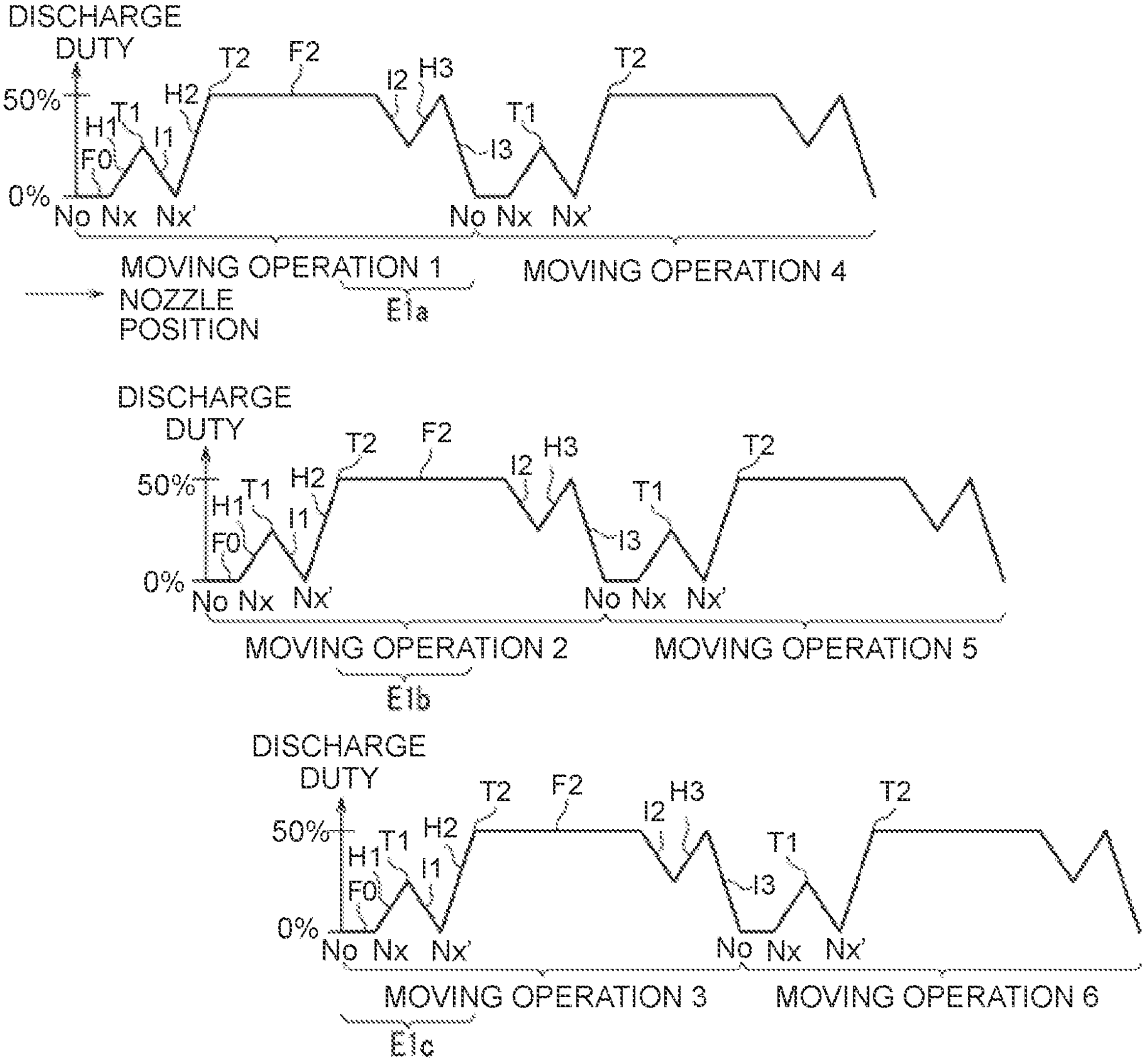

FIGS. 11A and 11B are graphs depicting the function of discharge duty of nozzles to nozzle positions in the conveyance direction when a recording is carried out by three moving operations to a unit area of a paper. FIG. 11A is a graph depicting the case where defect nozzles belong respectively to the chevron portion and a base portion of the function, and FIG. 11B is a graph depicting a function obtained by changing the function of FIG. 11A.

Figure 12A:
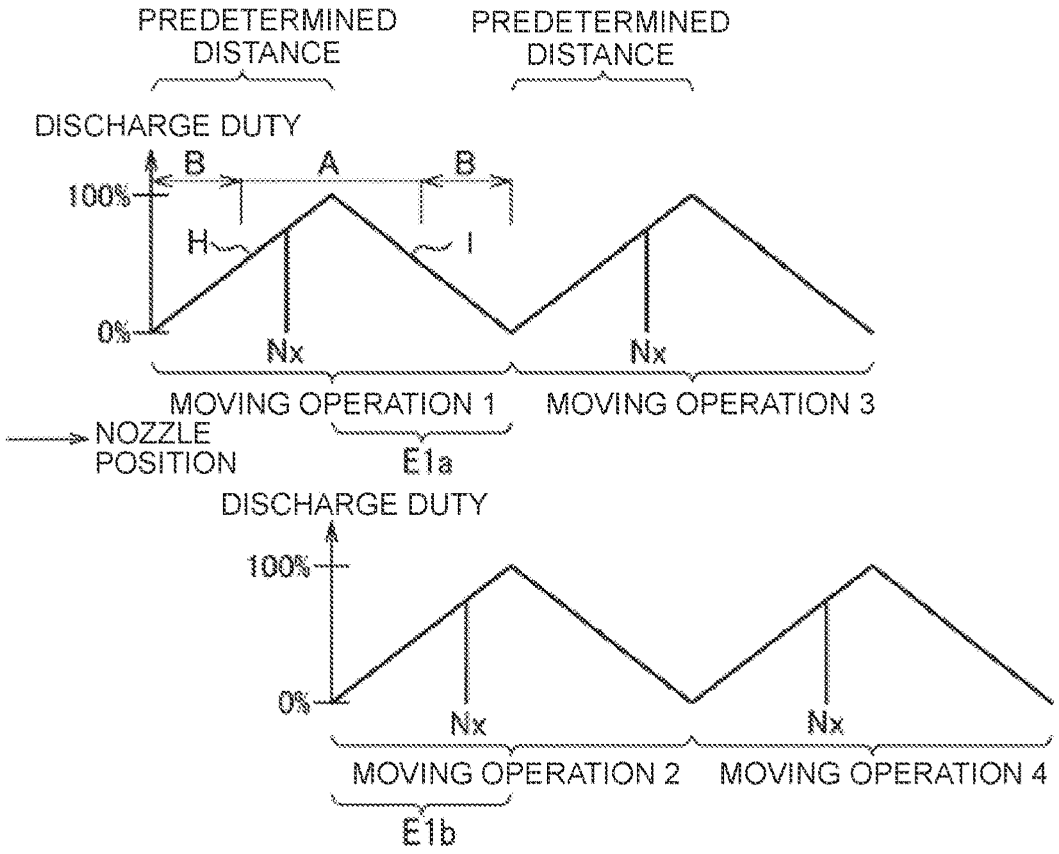
Figure 12B:
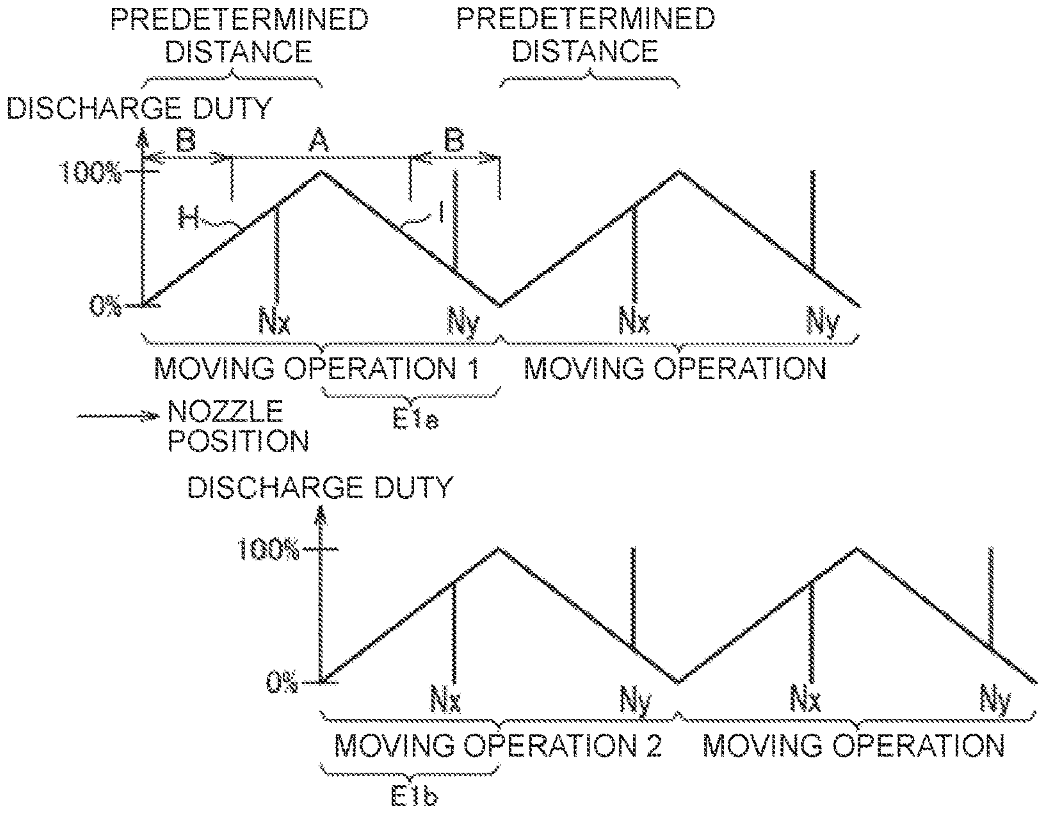

FIGS. 12A and 12B are graphs depicting a referential example of the present disclosure. FIG. 12A is a graph similar to FIG. 4A, depicting the function of discharge duty of nozzles to nozzle positions in the conveyance direction when a recording is carried out by two moving operations to a unit area of a paper, and depicting the case where a defect nozzle belongs to the chevron portion of the function. FIG. 12B is a graph depicting a raised discharge duty of another nozzle corresponding to the defect nozzle position in the function of FIG. 12A.

Figure 1:
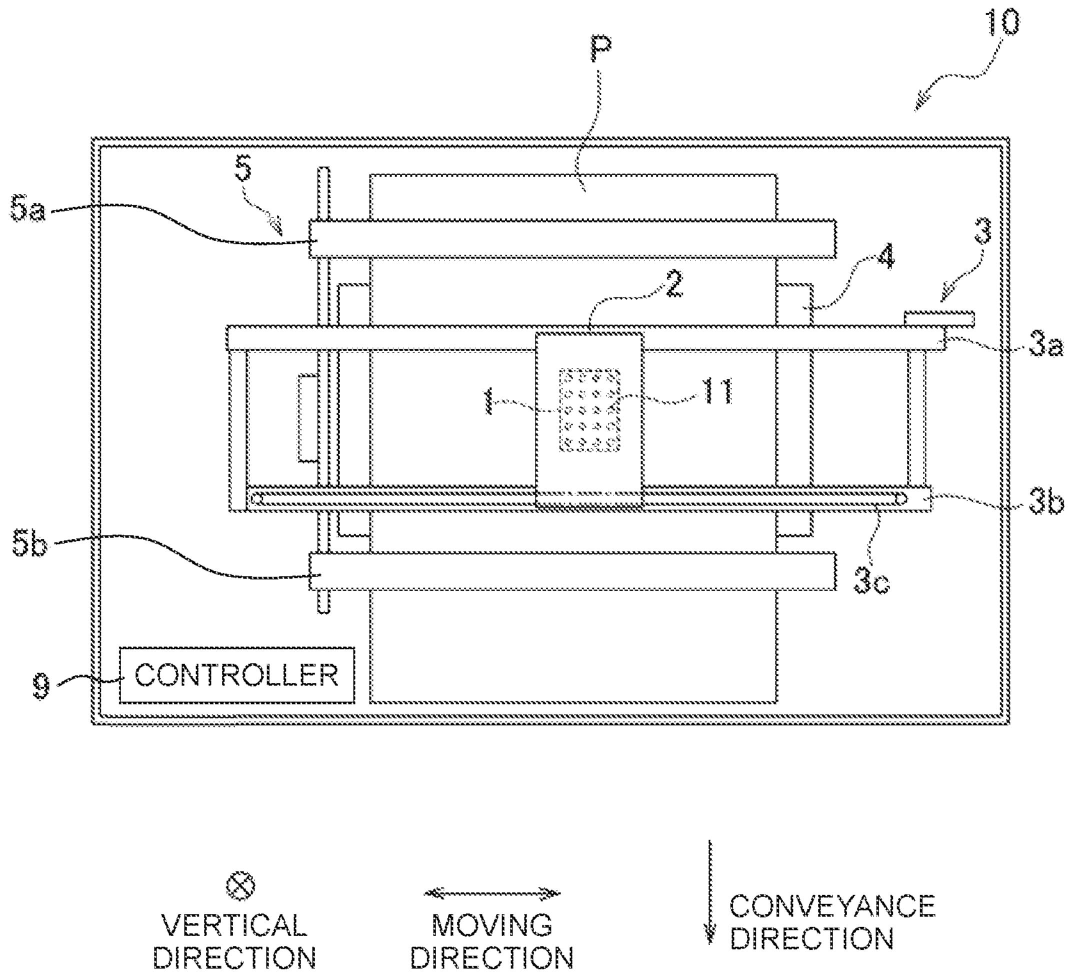
FIG. 1 is a plan view of a printer.

A printer 10 (a liquid discharge apparatus) according to an embodiment of the present disclosure has, as depicted in FIG. 1, a head 1 having a plurality of nozzles 11 in the lower surface thereof, a carriage 2 holding the head 1, a moving mechanism 3 to move the carriage 2 in a moving direction (orthogonal to a vertical direction), a platen 4 supporting paper P (a recording medium) from below, a conveying mechanism 5 to convey the paper P in a conveyance direction (orthogonal to the moving direction and the vertical direction), and a controller 9.

The head 1 is driven by a driver IC 1*x* (see FIG. 2) under the control of the controller 9 to discharge an ink from the nozzles 11. The nozzles 11 form four nozzle arrays arranged in the moving direction. Each nozzle array is formed from a plurality of nozzles 11 apart from each other in the conveyance direction.

The moving mechanism 3 includes a pair of guides 3*a* and 3*b* supporting the carriage 2, and a belt 3*c* linked to the carriage 2. The guides 3*a* and 3*b* and the belt 3*c* extend in the moving direction. Being driven by a carriage motor 3*x* (see FIG. 2) under the control of the controller 9, the belt 3*c* runs such that the carriage 2 moves in the moving direction along the guides 3*a* and 3*b*.

The platen 4 is arranged below the carriage 2 and the head 1. The paper P is placed on the upper surface of the platen 4.

The conveying mechanism 5 has two rollers 5*a* and 5*b*. The head 1, the carriage 2, and the platen 4 are arranged between the roller 5*a* and the roller 5*b* in the conveyance direction. Being driven by a conveyance motor 5*x* (see FIG. 2) under the control of the controller 9, the rollers 5*a* and 5*b* rotate with the paper P being nipped to convey the paper P in the conveyance direction.

Figure 2:
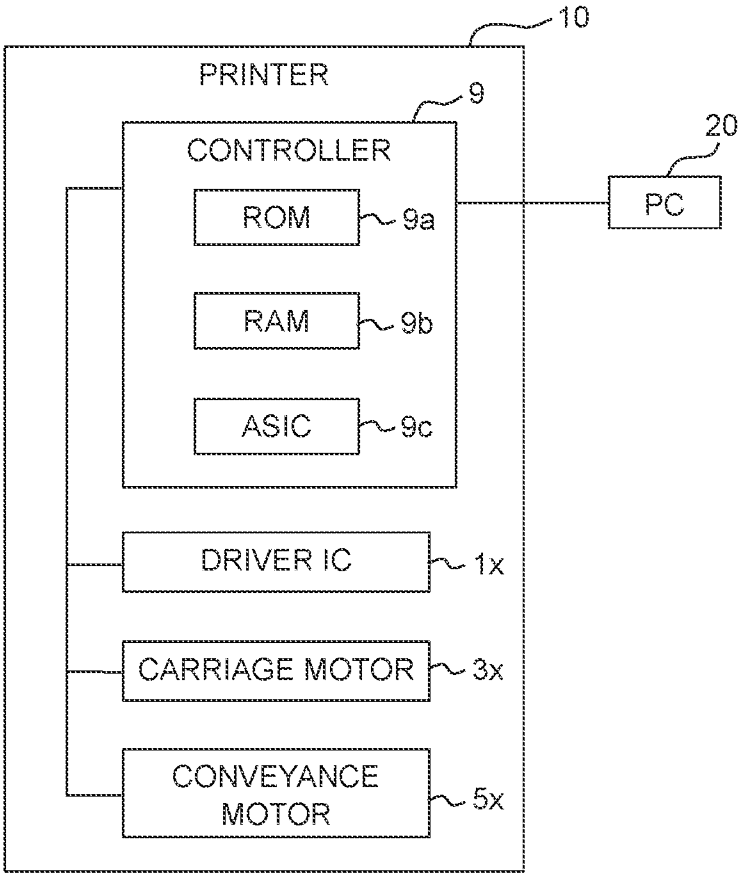
FIG. 2 is a block diagram depicting an electrical configuration of the printer of FIG.

The controller 9 has, as depicted in FIG. 2, a ROM (Read Only Memory) 9*a*, a RAM (Random Access Memory) 9*b*, and an ASIC (Application Specific Integrated Circuit) 9*c*. The ROM 9*a* stores programs and data for the ASIC 9*c* to control various operations. The RAM 9*b* temporarily stores data for the ASIC 9*c* to use for executing the programs. The ASIC 9*c* carries out a recording process according to the programs and data stored in the ROM 9*a* and the RAM 9*b* on the basis of a recording command (including an image data) received from an external device (such as a PC 20 or the like depicted in FIG. 2).

The recording process includes a conveyance process of conveying the paper P in the conveyance direction with the conveying mechanism 5, and a discharge process of discharging the ink from the plurality of nozzles 11 onto the paper P. The discharge process includes a plurality of moving operations for the moving mechanism 3 to move the head 1 in the moving direction while discharging the ink from the nozzles 11 onto the paper P. One moving operation refers to either an operation (forward) from one side to the other side in the moving direction or an operation (backward) from the other side to the one side in the moving direction. In the recording process, the controller 9 controls the driver IC 1*x*, the carriage motor 3*x*, and the conveyance motor 5*x* to alternately carry out the conveyance process for the conveying mechanism 5 to convey the paper P through a predetermined distance (predetermined amount) in the conveyance direction, and the discharge process. By virtue of this, ink dots are formed on the paper P, and thus the image is recorded.

Figure 3:
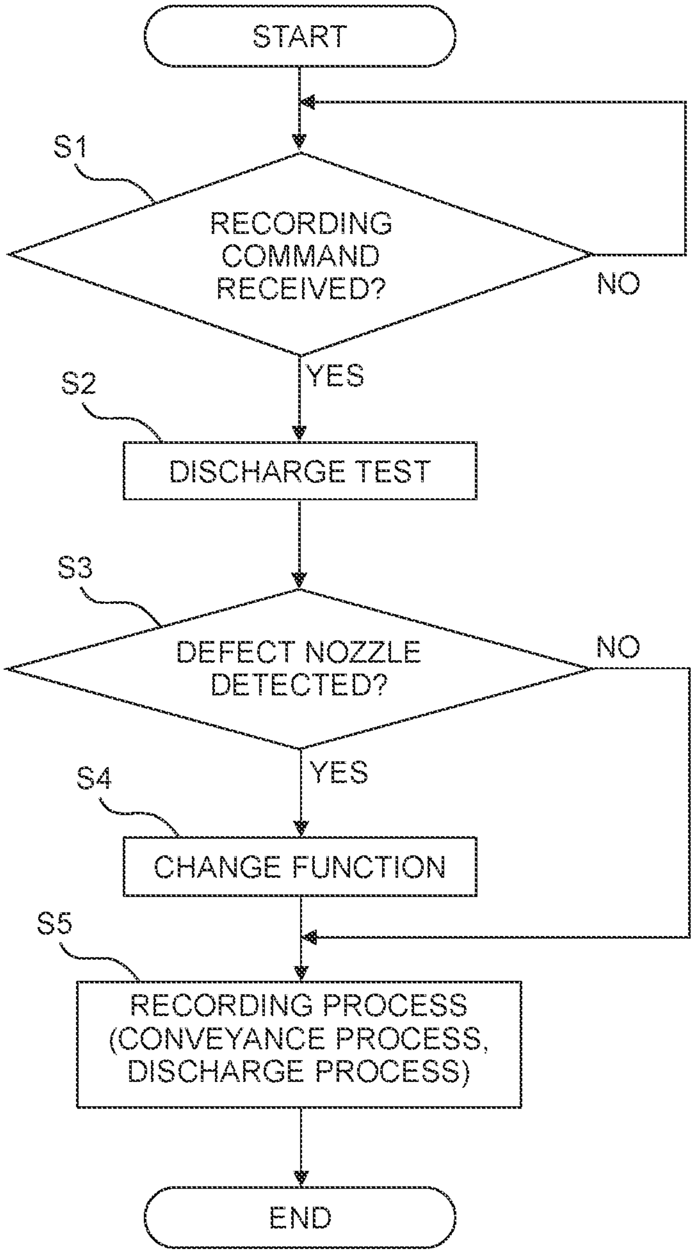
FIG. 3 is a flow chart depicting a program executed by a controller of the printer of FIG. 1.

Next, referring to FIG. 3, a detailed explanation will be made on the process carried out by the controller 9.

The controller 9 first determines whether or not a recording command is received from the PC 20 or the like (step S1). If the recording command is not received (step S1: No), then the controller 9 repeats the step S1.

If the controller determines that the recording command is received (step S1: Yes), then the controller 9 carries out a discharge test (step S2). The discharge test corresponds to an example of the "detection process" of an aspect of the present invention, which is a process for detecting a "defect nozzle" among the plurality of nozzles 11. The "defect nozzle" refers to the nozzle 11 which does not discharge the ink, the nozzle 11 of which discharge amount is decreased from a prescribed amount, and the nozzle 11 which discharges the ink so that the ink is landed on a position deviated from a designed position, due to clog of the nozzle 11 caused, for example, by an increase of the ink viscosity. In the step S2, it is used, for example, an optical sensor having a light emitting element and a light receiving element. The ink is discharged in order from each nozzle 11, and the light receiving element receives the light generated on the occasion of intersection between the ink droplet and the light emitted by the light emitting element. Based on the intensity of the light received by the light receiving element, it is detected whether or not there is a defect nozzle, and its position if there is a defect nozzle. Alternatively, in the step S2, the ink may be discharged from each nozzle 11 onto the paper P for the test to form a test pattern, and a user may detect whether or not there is a defect nozzle, and its position if there is a defect nozzle, by way of observing the formed test pattern with the eyes.

After the step S2, the controller 9 determines whether or not a defect nozzle is detected on the basis of the result of the step S2 (step S3). On determining that a defect nozzle is detected (step S3: Yes), the controller 9 changes a function (that is, a function of discharge duty of nozzles 11 to the positions of the nozzles 11 in the conveyance direction) used in the discharge process included in the recording process (step S5) (step S4). The step S4 corresponds to an example of the "change process" of an aspect of the present invention. The discharge duty refers to a ratio of the discharge amount of a certain nozzle 11 to the necessary discharge amount of the certain nozzle 11 on the basis of the image data included in the recording command received in the step S1. The function prior to the change (unchanged function) is determined on the basis of the image data at an arbitrary timing after the step S1 and before the step S3.

The discharge process includes a plurality of discharge steps carried out at time intervals for a unit area of the paper P (the steps corresponding to the moving operations). The unit area of the paper P corresponds to a conveying distance (a predetermined distance, a predetermined amount) in the conveyance process. That is, the width of the unit area of the paper P in the conveyance direction is equivalent to the conveying distance in the conveyance process.

FIG. 4A is a graph depicting the unchanged function when a recording is carried out by two moving operations to a unit area of a piece of the paper P. For example, each nozzle array includes 30 nozzles 11 and the unit area of the paper P corresponds to fifteen nozzles 11 arranged in the conveyance direction. A moving operation 1 to a moving operation 4 are carried out successively, and the conveyance process for conveying the paper P through the predetermined distance (predetermined amount) in the conveyance direction is carried out in a period between the moving operations. The horizontal axis shows the positions of the plurality of nozzles 11 in the conveyance direction in the range of each of the moving operations 1 to 4, whereas the vertical axis shows the discharge duty of each nozzle 11. In each of the moving operations 1 to 4, the discharge duties of the nozzle 11 positioned at the upstream end in the conveyance direction and the nozzle 11 positioned at the downstream end in the conveyance direction are 0%. In each of the moving operations 1 to 4, the discharge duty of the nozzle 11 positioned at the center in the conveyance direction is at the maximum value (100%).

In successive moving operations (such as in FIG. 4A, the moving operation 1 and the moving operation 2, the moving operation 2 and the moving operation 3, and the moving operation 3 and the moving operation 4), the discharge area for the ink onto the paper P in the first moving operation and the discharge area for the ink onto the paper P in the second moving operation have parts overlapping with each other (such an overlapping part corresponds to a unit area). The successive moving operations build up the discharge steps for a unit area of the paper P, respectively. In FIG. 4A, the moving operations 1 and 2 build up the discharge steps E1*a* and E1*b* for a unit area of the paper P. In FIG. 4A, two discharge steps are carried out for each unit area.

In the plurality of discharge steps for a unit area of the paper P, based on data where the image data is decomposed into complementary patterns, the ink is discharged selectively from the plurality of nozzles 11. That is, a mask is used to divide the image data with which a recording can be conducted usually through one moving operation, so as to carry out the discharge using different nozzles 11 for each discharge step (the singling method). Then, the plurality of discharge steps are configured to let the discharge duty of each nozzle 11 become 100% (that is, for each of the plurality of nozzles 11, the sum of the discharge duties of the plurality of discharge steps becomes 100%). Note that in the plurality of discharge steps for a unit area of the paper P, there may be some nozzles 11 not used for the discharge.

In at least one of the plurality of discharge steps corresponding to a unit area of the paper P, the aforementioned function has an ascending portion H of gradual increase or a descending portion I of gradual decrease, from upstream to downstream in the conveyance direction. In FIG. 4A, the function for the discharge step E1*a* has the descending portion I of gradual decrease from upstream to downstream in the conveyance direction. The function for the discharge step E1*b* has the ascending portion H of gradual increase from upstream to downstream in the conveyance direction. The absolute value of inclination is the same between the descending portion I and the ascending portion H.

Further, in the plurality of unit areas adjacent to each other in the conveyance direction, the function is composed at least of the ascending portion H and the descending portion I. In FIG. 4A, the moving operation 1 corresponds to two unit areas adjacent to each other in the conveyance direction, and the function for the moving operation 1 is composed of the ascending portion H and the descending portion I. That is, in those two unit areas adjacent to each other in the conveyance direction, the function has a chevron shape with the peak of the maximum value (100%) at the center in the conveyance direction, descending from the peak upstream and downstream in the conveyance direction, respectively, from 100% to 0%.

The controller 9 varies the function in the step S4 depending on whether a defect nozzle $N_x$ belongs to a chevron portion A or a base portion B of the function in the chevron shape. Note that a defect nozzle belonging to the chevron portion and the base portion of the function means that the discharge duty of the defect nozzle is shown by the chevron portion and by the base portion, respectively.

The chevron portion A is a certain range including the peak of the function (the center in the conveyance direction). For example, the chevron portion A is a range extending upstream in the conveying direction through a distance as far as half of the length in the conveying direction of the ascending portion H from the peak, and a range extending downstream in the conveying direction through a distance as far as half of the length in the conveying direction of the descending portion I from the peak.

The base portion B is a certain range including a base end of the function (the upstream end or the downstream end in the conveyance direction). For example, the upstream base portion B in the conveyance direction is a range extending downstream in the conveyance direction from the base end (the upstream end in the conveyance direction), through a distance as far as half of the length in the conveyance direction of the ascending portion H. Still for example, the downstream base portion B in the conveyance direction is a range extending upstream in the conveyance direction from the base end (the downstream end in the conveyance direction), through a distance as far as half of the length in the conveyance direction of the descending portion I.

As depicted in FIG. 4A, if the defect nozzle $N_x$ belongs to the chevron portion A, then the controller 9 provides peaks T1 and T2 in the function (the graph of the function) at upstream and downstream respectively in the conveyance direction of the position showing the discharge duty of the defect nozzle $N_x$ (see FIG. 4B). In other words, the controller 9 changes the function determined on the basis of the image data (see FIG. 4A) into another function (see FIG. 4B). In particular, the first peak T1 is associated with a nozzle 11 positioned between the defect nozzle $N_x$ and the nozzle 11 positioned at the upstream end in the conveyance direction, and the second peak T2 is associated with a nozzle 11 positioned between the defect nozzle $N_x$ and the nozzle 11 positioned at the downstream end in the conveyance direction (that is, here, the nozzle 11 positioned at the center in the conveyance direction with the 100% discharge duty in the unchanged function depicted in FIG. 4A). Then, an ascending portion H1 is defined as the area from the position showing the discharge duty of the nozzle 11 positioned at the upstream end in the conveyance direction to the first peak T1; a descending portion I1 is defined as the area from the first peak T1 to the position showing the discharge duty of the defect nozzle $N_x$; an ascending portion H2 is defined as the area from the position showing the discharge duty of defect nozzle $N_x$ to the second peak T2; a descending portion I2 is defined as the area from the second peak T2 to the position showing a first predetermined discharge duty (the position deviating downstream from the first peak T1 by a conveying distance (a predetermined distance) in the conveyance direction, to be referred to below as "first predetermined discharge duty position"); an ascending portion H3 is defined as the area from the first predetermined discharge duty position to the position at the 100% discharge duty (the position deviating downstream from the defect nozzle $N_x$ by the conveying distance (the predetermined distance) in the conveyance direction, to be referred to below as "100% discharge duty position"); and descending portion 13 is defined as the area from the 100% discharge duty position to the position showing the discharge duty of the nozzle 11 positioned at the downstream end in the conveyance direction. In the discharge step E1$a$, the changed function (see FIG. 4B) includes the descending portion I2 from the second peak T2 to the first predetermined discharge duty position, the ascending portion H3 from the first predetermined discharge duty position to the 100% discharge duty position, and the descending portion 13 from the 100% discharge duty position to the position showing the discharge duty of the nozzle 11 positioned at the downstream end in the conveyance direction. In the discharge step E1$b$, the changed function includes the ascending portion H1 from the position showing the discharge duty of the nozzle 11 positioned at the upstream end in the conveyance direction to the first peak T1, the descending portion I1 from the first peak T1 to the position showing the discharge duty of the defect nozzle $N_x$, and the ascending portion H2 from the position showing the discharge duty of the defect nozzle $N_x$ to the second peak T2. The changed function is configured such that the discharge duty of each nozzle 11 become 100% in the discharge steps E1$a$ and E1$b$ for the unit area of the paper P. In other words, the changed function is configured such that for each of the plurality of nozzles 11, the sum of the discharge duty value of the discharge step E1$a$ and the discharge duty value of the step E1$b$ become 100%. Therefore, the discharge steps E1$a$ and E1$b$ maintain a complementary relationship. The sum of the discharge duty at the first peak T1 and the first predetermined discharge duty becomes 100%.

As depicted in FIG. 5A, if the defect nozzle $N_x$ belongs to the base portion B, then the controller 9 flattens the area in the function (the graph of the function) from the position showing the discharge duty of the nozzle No belonging to the base end (the upstream end in the conveyance direction) to the position showing the discharge duty of the defect nozzle $N_x$ (see FIG. 5B). In other words, the controller 9 changes the function determined on the basis of the image data (see FIG. 5A) into another function (see FIG. 5B). In particular, a flat portion F0 with the 0% discharge duty is defined as the area from the position showing the discharge duty of the nozzle No belonging to the base end (the upstream end in the conveyance direction) to the position showing the discharge duty of the defect nozzle $N_x$; an ascending portion H1 is defined as the area from the position showing the discharge duty of the defect nozzle $N_x$ to the position at the 100% discharge duty (that is, here, the position corresponding to the nozzle 11 positioned at the center in the conveyance direction with the 100% discharge duty in the unchanged function depicted in FIG. 5A, to be referred to below as "100% discharge duty position); a flat portion F1 with the 100% discharge duty is defined as the area which extends from the peak of the ascending portion H1 and which shows the discharge duty of nozzles 11 as much as the number of nozzles 11 of the flat portion F0 with the 0% discharge duty; and a descending portion I1 is defined as the from the downstream end of the flat portion F1 in the conveyance direction to the position showing the discharge duty of the nozzle 11 positioned at the downstream end in the conveyance direction. In the discharge step E1$a$, the changed function (see FIG. 5B) includes the flat portion F1 with the 100% discharge duty, and the descending portion I1 from the downstream end of the flat portion F1 in the conveyance direction to the position showing the discharge duty of the nozzle 11 positioned at the downstream end in the conveyance direction. In the discharge step E1$b$, the changed function includes the flat portion F0 with the 0% discharge duty defined as the area from the position showing the discharge duty of the nozzle No belonging to the base end (the upstream end in the conveyance direction) to the position showing the discharge duty of the defect nozzle $N_x$, and the ascending portion H1 from the position showing the discharge duty of the defect nozzle $N_x$ to the 100% discharge duty position. The changed function is configured such that the discharge duty of each nozzle 11 become 100% in the discharge steps E1$a$ and E1$b$ for the unit area of the paper P. In other words, for each nozzle 11, the changed function is configured such that the sum of the discharge duty value of step E1$a$ and the discharge duty value of the step E1$b$ becomes 100%. Therefore, the discharge steps E1$a$ and E1$b$ maintain a complementary relationship.

As depicted in FIG. 6A, if two defect nozzles $N_x$ and $N_x'$ belong to the base portion B, then the controller 9 flattens the area in the function (the graph of the function) from the position showing the discharge duty of the nozzle No belonging to the base end (the upstream end in the conveyance direction) to the position showing the discharge duty of the defect nozzle $N'_x$ closest to the chevron portion between the two defect nozzles $N_x$ and $N_x'$ (see FIG. 6B). In other words, the controller 9 changes the function determined on the basis of the image data (see FIG. 6A) into another function (see FIG. 6B). In particular, a flat portion F0 with the 0% discharge duty is defined as the area from the position showing the discharge duty of the nozzle No belonging to the base end (the upstream end in the conveyance direction) to the position showing the discharge duty of the defect nozzle $N_x'$ closest to the chevron portion between the two defect nozzles $N_x$ and $N_x'$; an ascending portion H1 is defined as the area from the position showing the discharge duty of the defect nozzle $N_x'$ to the position at the 100% discharge duty (that is, here, the position corresponding to the nozzle 11 positioned at the center in the conveyance direction with the 100% discharge duty in the unchanged function depicted in FIG. 6A, to be referred to below as "100% discharge duty position); a flat portion F1 with the 100% discharge duty is defined as the area which extends from the peak of the ascending portion H1 and which shows the discharge duty of nozzles 11 as much as the number of nozzles 11 of the flat portion F0 with the 0% discharge duty; and a descending portion I1 is defined as the area from the downstream end of the flat portion F1 in the conveyance direction to the position showing the discharge duty of the nozzle 11 positioned at the downstream end in the conveyance direction. In the discharge step E1$a$, the changed function (see FIG. 6B) includes the flat portion F1 with the 100% discharge duty, and the descending portion I1 from the downstream end of the flat portion F1 in the conveyance direction to the position showing the discharge duty of the nozzle 11 positioned at the downstream end in the conveyance direction. In the discharge step E1$b$, the changed function includes the flat portion F0 with the 0% discharge duty defined as the area from the position showing the discharge duty of the nozzle No belonging to the base end (the upstream end in the conveyance direction) to the position showing the discharge duty of the defect nozzle $N_x'$, and the ascending portion H1 from the position showing the discharge duty of the defect nozzle $N_x'$ to the 100% discharge duty position. The changed function is configured such that the discharge duty of each nozzle 11 become 100% in the discharge steps E1*a* and E1*b* for the unit area of the paper P. In other words, for each of the plurality of nozzles 11, the sum of the discharge duty value of the step E1*a* and the discharge duty value of the step E1*b* becomes 100%. Therefore, the discharge steps E1*a* and E1*b* maintain a complementary relationship.

As depicted in FIG. 7A, if the defect nozzles $N_x$' and $N_x$ belong respectively to the chevron portion A and the base portion B of the function, then the controller 9 provides peaks T1 and T2 in the function (the graph of the function) at upstream and downstream respectively in the conveyance direction of the position showing the discharge duty of the defect nozzle $N_x$' belonging to the chevron portion A, and flattens the area from the position showing the discharge duty of the nozzle No belonging to the base end (the upstream end in the conveyance direction) to the position showing the discharge duty of the defect nozzle $N_x$ belonging to the base portion B (see FIG. 7B). In other words, the controller 9 changes the function determined on the basis of the image data (see FIG. 7A) into another function (see FIG. 7B). In particular, the first peak T1 is associated with a nozzle 11 positioned between the defect nozzle $N_x$ and the defect nozzle $N_x$' in the conveyance direction, and the second peak T2 is associated with a nozzle 11 positioned between the defect nozzle $N_x$ and the nozzle 11 positioned at the downstream end in the conveyance direction (that is, here, the nozzle 11 positioned at the center in the conveyance direction with the 100% discharge duty in the unchanged function depicted in FIG. 7A). Then, a flat portion F0 with the 0% discharge duty is defined as the area from the position showing the discharge duty of the nozzle No belonging to the base end (the upstream end in the conveyance direction) to the position showing the discharge duty of the defect nozzle $N_x$ belonging to the base portion B; an ascending portion H1 is defined as the area from the position showing the discharge duty of the defect nozzle $N_x$ to the first peak T1; a descending portion I1 is defined as the area from the first peak T1 to the position showing the discharge duty of the defect nozzle $N_x$'. An ascending portion H2 is defined as the area from the position showing the discharge duty of the defect nozzle $N_x$' to the second peak T2; a flat portion F2 with the 100% discharge duty is defined as the area which extends downstream in the conveyance direction from the peak of the ascending portion H2 and which shows the discharge duty of nozzles 11 as much as the number of nozzles 11 of the flat portion F0 with the 0% discharge duty; a descending portion I2 is defined as the area from the downstream end of the flat portion F2 in the conveyance direction to the position showing a second predetermined discharge duty (the position deviating downstream from the first peak T1 by a conveying distance (a predetermined distance) in the conveyance direction, to be referred to below as "second predetermined discharge duty position"). An ascending portion H3 is defined as the area from the second predetermined discharge duty position to the position at the 100% discharge duty (the position deviating downstream from the defect nozzle $N_x$' by a conveying distance (a predetermined distance) in the conveyance direction, to be referred to below as "100% discharge duty position"); a descending portion 13 is defined as the area from the 100% discharge duty position to the position showing the discharge duty of the nozzle 11 positioned at the downstream end in the conveyance direction. In the discharge step E1*a*, the changed function (see FIG. 7B) includes the flat portion F2 with the 100% discharge duty, the descending portion I2 from the downstream end of the flat portion F2 in the conveyance direction to the second predetermined discharge duty position, the ascending portion H3 from the second predetermined discharge duty position to the 100% discharge duty position, and the descending portion 13 from the 100% discharge duty position to the position showing the discharge duty of the nozzle 11 positioned at the downstream end in the conveyance direction. In the discharge step E1*b*, the changed function includes the flat portion F0 with the 0% discharge duty from the position showing the discharge duty of the nozzle No belonging to the base end (the upstream end in the conveyance direction) to the position showing the discharge duty of the defect nozzle $N_x$ belonging to the base portion B, the ascending portion H1 from the position showing the discharge duty of the defect nozzle $N_x$ to the first peak T1, the descending portion I1 from the first peak T1 to the position showing the discharge duty of the defect nozzle $N_x$', and the ascending portion H2 from the position showing the discharge duty of the defect nozzle $N_x$' to the second peak T2. The changed function is configured such that the discharge duty of each nozzle 11 become 100% in the discharge steps E1*a* and E1*b* for the unit area of the paper P. In other words, for each of the plurality of nozzles 11, the sum of the discharge duty value of the discharge step E1*a* and the discharge duty value of the discharge step E1*b* becomes 100%. Therefore, the discharge steps E1*a* and E1*b* maintain a complementary relationship. The sum of the discharge duty at the first peak T1 and the second predetermined discharge duty becomes 100%.

FIG. 8A is a graph depicting the unchanged function when a recording is carried out by three moving operations to a unit area of the paper P. For example, each nozzle array includes 30 nozzles 11 and the unit area of the paper P corresponds to ten nozzles 11 arranged in the conveyance direction. A moving operation 1 to a moving operation 6 are carried out successively, and the conveyance process for conveying the paper P through the predetermined distance in the conveyance direction is carried out in a period between the moving operations. The horizontal axis shows the positions of the plurality of nozzles 11 in the conveyance direction in the range of each of the moving operations 1 to 6, whereas the vertical axis shows the discharge duty of each nozzle 11. In each of the moving operations 1 to 6, the discharge duties of the nozzle 11 positioned at the upstream end in the conveyance direction and the nozzle 11 positioned at the downstream end in the conveyance direction are 0%. In each of the moving operations 1 to 6, the discharge duty of the nozzle 11 positioned at the center in the conveyance direction is at the maximum value (50%).

Between successive moving operations (such as in FIG. 8A, the moving operations 1 to 3, the moving operations 2 to 4, the moving operations 3 to 5, and moving operations 4 to 6), there are parts overlapping with each other between the discharge area for the ink onto the paper P in the first moving operation, the discharge area for the ink onto the paper P in the second moving operation, and the discharge area for the ink onto the paper P in the third moving operation (such an overlapping part corresponds to a unit area). The successive moving operations build up the discharge steps for a unit area of the paper P. In FIG. 8A, the moving operations 1 to 3 build up the discharge steps E1*a*, E1*b*, and E1*c* for a unit area of the paper P. In FIG. 8A, three discharge steps are carried out for each unit area.

In at least one of the plurality of discharge steps corresponding to a unit area of the paper P, the aforementioned function has an ascending portion H of gradual increase or a descending portion I of gradual decrease, from upstream to downstream in the conveyance direction. In FIG. 8A, the function for the discharge step E1*a* has the descending portion I of gradual decrease from upstream to downstream in the conveyance direction. The function for the discharge step E1*b* has a flat portion F with a constant discharge duty (50%). The function for the discharge step E1*c* has the ascending portion H of gradual increase from upstream to downstream in the conveyance direction. The absolute value of inclination is the same between the descending portion I and the ascending portion H.

Further, in the plurality of unit areas adjacent to each other in the conveyance direction, the function is composed at least of the ascending portion H and the descending portion I. In FIG. 8A, the moving operation 1 corresponds to three unit areas adjacent to each other in the conveyance direction, and the function for the moving operation 1 is composed of the ascending portion H, the flat portion F, and the descending portion I. That is, in those three unit areas adjacent to each other in the conveyance direction, the function has a chevron shape with the peak of the maximum value (50%) at the center in the conveyance direction, descending from the peak upstream and downstream in the conveyance direction, respectively, from 50% to 0%.

In FIG. 8A, the chevron portion A is a certain range including the peak of the function (the flat portion F). The chevron portion A includes the peak (the flat portion F), the range extending from the peak (the flat portion F) upstream in the conveyance direction through a distance as far as half of the length in the conveyance direction of the ascending portion H, and the range extending from the peak (the flat portion F) downstream in the conveyance direction through a distance as far as half of the length in the conveyance direction of the descending portion I. That is, the chevron portion A occupies ⅔ of the area in the conveyance direction in the function of the moving operation 1. On the other hand, the base portion B occupies ⅓ of the area in the conveyance direction in the moving operation 1.

When the recording is carried out through three moving operations to a unit area of the paper P (see FIGS. 8A and 8B to 11A and 11B), the process for changing the function is carried out in the same manner as to carry out the recording through two moving operations to a unit area of the paper P (see FIGS. 4A and 4B to 7A and 7B).

As depicted in FIG. 8A, if the defect nozzle $N_x$ belongs to the chevron portion A, then the controller 9 provides peaks T1 and T2 in the function (the graph of the function) at upstream and downstream respectively in the conveyance direction of the position showing the discharge duty of the defect nozzle $N_x$ (see FIG. 8B). In other words, the controller 9 changes the function determined on the basis of the image data (see FIG. 8A) into another function (see FIG. 8B). In particular, the first peak T1 is associated with a nozzle 11 positioned between the defect nozzle N& and the nozzle 11 positioned at the upstream end in the conveyance direction (that is, here, the nozzle 11 corresponding to the upstream end of the flat portion F in the conveyance direction in the chevron portion A in the unchanged function depicted in FIG. 8A), and the second peak T2 is associated with a nozzle 11 positioned between the defect nozzle $N_x$ and the nozzle 11 positioned at the downstream end in the conveyance direction (that is, here, one of the plurality of nozzles 11 corresponding to the flat portion F at the downstream side of the position showing the discharge duty of the defect nozzle $N_x$ in the conveyance direction in the chevron portion A in the unchanged function depicted in FIG. 8A). Then, an ascending portion H0 is defined as the area from the position showing the discharge duty of the nozzle 11 positioned at the upstream end in the conveyance direction to the position showing the discharge duty of 50% (the position deviating upstream from the defect nozzle $N_x$ by a conveying distance (a predetermined distance) in the conveyance direction, to be referred to below as "50% discharge duty position"); a descending portion I0 is defined as the area from the 50% discharge duty position to the position showing a third predetermined discharge duty (the position deviating upstream from the second peak T2 by a conveying distance (a predetermined distance) in the conveyance direction, to be referred to below as "third predetermined discharge duty position"); an ascending portion H1 is defined as the area from the third predetermined discharge duty position to the first peak T1; a descending portion I1 is defined as the area from the first peak T1 to the position showing the discharge duty of the defect nozzle $N_x$; an ascending portion H2 is defined as the area from the position showing the discharge duty of the defect nozzle $N_x$ to the second peak T2; a flat portion F2 with the 50% discharge duty is defined as the area from the second peak T2 to the position deviating downstream from the defect nozzle $N_x$ by a conveying distance (a predetermined distance) in the conveyance direction; a descending portion I21 is defined as the area from the downstream end of the flat portion F2 in the conveyance direction to the position showing a fourth predetermined discharge duty (the position deviating downstream from the second peak T2 by a conveying distance (a predetermined distance) in the conveyance direction, to be referred to below as "fourth predetermined discharge duty position"); and a descending portion 122 is defined as the area from the fourth predetermined discharge duty position to the position showing the discharge duty of the nozzle 11 positioned at the downstream end in the conveyance direction. In the discharge step E1*a*, the changed function (see FIG. 8B) includes part of the flat portion F2 with the 50% discharge duty, the descending portion I21 from the downstream end of the flat portion F2 in the conveyance direction to the fourth predetermined discharge duty position, and the descending portion 122 from the fourth predetermined discharge duty position to the position showing the discharge duty of the nozzle 11 positioned at the downstream end in the conveyance direction. In the discharge step E1*b*, the changed function includes the descending portion I1 from the first peak T1 to the position showing the discharge duty of the defect nozzle $N_x$, the ascending portion H2 from the position showing the discharge duty of the defect nozzle $N_x$ to the second peak T2, and the rest part of the flat portion F2 with the 50% discharge duty being maintained. In the discharge step E1*c*, the changed function includes the ascending portion H0 from the position showing the discharge duty of the nozzle 11 positioned at the upstream end in the conveyance direction to the 50% discharge duty position, the descending portion I0 from the 50% discharge duty position to the third predetermined discharge duty position, and the ascending portion H1 from the third predetermined discharge duty position to the first peak T1. The changed function is configured such that the discharge duty of each of the plurality of nozzles 11 become 100% in the discharge steps E1*a* to E1*c* for the unit area of the paper P. In other words, the changed function is configured such that for each of the plurality of nozzles 11, the sum of the discharge duty value of the discharge step E1*a*, the discharge duty value of the discharge step E1*b*, and the discharge duty value of the discharge step E1*c* becomes 100%. Therefore, the discharge steps E1*a* to E1*c* maintain a complementary relationship. The sum of the third predetermined discharge duty and the fourth predetermined discharge duty becomes 50%.

Hereinbelow, the reason for the changed function to become what is depicted in FIG. 8B will be explained. Because the changed function has a part maintaining the 50% discharge duty at the peak (the flat portion F) of the function in the chevron portion A, the ascending portion H and the descending portion I in FIG. 8A can be used to let the sum of the discharge duties become 100%. On the other hand, the changed function includes the part without maintaining the 50% discharge duty at the peak (the area corresponding to the flat portion F of the unchanged function) of the function in the chevron portion A, that is, it includes the surrounding parts of the defect nozzle $N_x$. Therefore, if the ascending portion H and the descending portion I of the unchanged function in FIG. 8A are used as they are, then the part in which the sum of the discharge duty value in the step E1*a*, the discharge duty value in the step E1*b*, and the discharge duty value in the step E1*c* is not 100% exists. Therefore, in the discharge step E1*a*, the changed function includes the descending portion I21 from the downstream end of the flat portion F2 to the fourth predetermined discharge duty position; and in the discharge step E1*c*, the changed function includes the descending portion I0 from the 50% discharge duty position to the third predetermined discharge duty position being not the 0% discharge duty. The descending portion I21 and the descending portion I0 have different inclination angles from the ascending portion H and the descending portion I of FIG. 8A, such that the sum of the discharge duty value shown by the descending portion I21, the discharge duty value shown by the descending portion I0, and the discharge duty value shown by the ascending portion H2 becomes 100%.

As depicted in FIG. 9A, if the defect nozzle $N_x$ belongs to the base portion B, then the controller 9 flattens an area in the function (the graph of the function) from the position showing the discharge duty of the nozzle No belonging to the base end (the upstream end in the conveyance direction) to the position showing the discharge duty of the defect nozzle $N_x$ (see FIG. 9B). In other words, the controller 9 changes the function determined on the basis of the image data (see FIG. 9A) into another function (see FIG. 9B). In particular, a flat portion F0 with the 0% discharge duty is defined as the area from the position showing the discharge duty of the nozzle No belonging to the base end (the upstream end in the conveyance direction) to the position showing the discharge duty of the defect nozzle $N_x$; an ascending portion H1 is defined as the area from the position showing the discharge duty of the defect nozzle $N_x$ to the position showing the discharge duty of 50% (that is, here, the position corresponding to the upstream end of the flat portion F in the conveyance direction in the unchanged function depicted in FIG. 9A, to be referred to below as "50% discharge duty position"); a flat portion F1 with the 50% discharge duty is defined as the area of the flat portion F in the unchanged function depicted in FIG. 9A, and the area having the same width as the flat portion F0 extending downstream in the conveyance direction from the downstream end of the flat portion F in the conveyance direction; and a descending portion I1 is defined as the area from the downstream end of the flat portion F1 in the conveyance direction to the position showing the discharge duty of the nozzle 11 positioned at the downstream end in the conveyance direction. In the discharge step E1*a*, the changed function (see FIG. 9B) includes part of the flat portion F1 with the 50% discharge duty, and the descending portion I1 from the downstream end of the flat portion F1 in the conveyance direction to the position showing the discharge duty of the nozzle 11 positioned at the downstream end in the conveyance direction. In the discharge step E1*b*, the changed function includes the rest part of the flat portion F1 with the 50% discharge duty. In the discharge step E1*c*, the changed function includes the flat portion F0 with the 0% discharge duty from the position showing the discharge duty of the nozzle No belonging to the base end (the upstream end in the conveyance direction) to the position showing the discharge duty of the defect nozzle $N_x$, and the ascending portion H1 from the position showing the discharge duty of the defect nozzle $N_x$ to the 50% discharge duty position. The changed function is configured such that the discharge duty of each nozzle 11 become 100% in the discharge steps E1*a* to E1*c* for the unit area of the paper P. In other words, the changed function is configured such that for each nozzle 11, the sum of the discharge duty value of the discharge step E1*a*, the discharge duty value of the discharge step E1*b*, and the discharge duty value of the discharge step E1*c* becomes 100%. Therefore, the discharge steps E1*a* to E1*c* maintain a complementary relationship. More specifically, in the changed function, the area from the position showing the discharge duty of the nozzle No belonging to the base end (the upstream end in the conveyance direction) to the position showing the discharge duty of the defect nozzle $N_x$ is flat Thus, the portion corresponding to the area from the position showing the discharge duty of the nozzle No belonging to the base end (the upstream end in the conveyance direction) to the position showing the discharge duty of the defect nozzle $N_x$ is configured such that the discharge duties become 50% in the discharge step E1*a* and the discharge step E1*b*. Therefore, the discharge step E1*a* includes the part of the 50% discharge duty and the descending portion I1 from the peak (the flat portion F1) in the function to the position showing the discharge duty of the nozzle 11 positioned at the downstream end in the conveyance direction. Note that the discharge step E1*c* includes the ascending portion H1 from the position showing the discharge duty of the defect nozzle $N_x$ to the 50% discharge duty position.

As depicted in FIG. 10A, if two defect nozzles $N_x$ and $N_x'$ belong to the base portion B, then the controller 9 flattens an area in the function (the graph of the function) from the position showing the discharge duty of the nozzle No belonging to the base end (the upstream end in the conveyance direction) to the position showing the discharge duty of the defect nozzle $N'_x$ closest to the chevron portion between the two defect nozzles $N_x$ and $N_x'$ (see FIG. 10B). In other words, the controller 9 changes the function determined on the basis of the image data (see FIG. 10A) into another function (see FIG. 10B). In particular, a flat portion F0 with the 0% discharge duty is defined as the area from the position showing the discharge duty of the nozzle No belonging to the base end (the upstream end in the conveyance direction) to position showing the discharge duty of the defect nozzle $N_x'$ closest to the chevron portion between the two defect nozzles $N_x$ and $N_x'$; an ascending portion H1 is defined as the area from the position showing the discharge duty of the defect nozzle $N_x'$ to the position showing the discharge duty of 50% (that is, here, the position corresponding to the upstream end of the flat portion F in the conveyance direction in the chevron portion A in the unchanged function depicted in FIG. 10A, to be referred to below as "50% discharge duty position"); a flat portion F1 with the 50% discharge duty is defined as the area of the flat portion F in the unchanged function depicted in FIG. 10A and the area having the same width as the flat portion F0 extending downstream in the conveyance direction from the downstream end of the flat portion F in the conveyance direction; and a descending portion I1 is defined as the area from the downstream end of the flat portion F1 in the conveyance direction to the position showing the discharge duty of the nozzle 11 positioned at the downstream end in the conveyance direction. In the discharge step E1*a*, the changed function (see FIG. 10B) includes a part of the flat portion F1 with the 50% discharge duty, and the descending portion I1 from the downstream end of the flat portion F1 in the conveyance direction to the position showing the discharge duty of the nozzle 11 positioned at the downstream end in the conveyance direction. In the discharge step E1*b*, the changed function includes the rest of the flat portion F1 with the 50% discharge duty. In the discharge step E1*c*, the changed function includes the flat portion F0 with the 0% discharge duty from the position showing the discharge duty of the nozzle No belonging to the base end (the upstream end in the conveyance direction) to the position showing the discharge duty of the defect nozzle $N_x$' closest to the chevron portion between the two defect nozzles $N_x$ and $N_x$', and the ascending portion H1 from the position showing the discharge duty of the defect nozzle $N_x$' to the 50% discharge duty position. The changed function is configured such that the discharge duty of each nozzle 11 become 100% in the discharge steps E1*a* to E1*c* for the unit area of the paper P. In other words, the changed function is configured such that for each nozzle 11, the sum of the discharge duty value of the discharge step E1*a*, the discharge duty value of the discharge step E1*b*, and the discharge duty value of the discharge step E1*c* becomes 100%. Thus, the discharge steps E1*a* to E1*c* maintain a complementary relationship. More specifically, in the changed function, the flattened area in the discharge step E1*c* extends from the position showing the discharge duty of the nozzle No belonging to the base end (the upstream end in the conveyance direction) to the position showing the discharge duty of the defect nozzle $N_x$'. Therefore, the portion corresponding to the flat portion F0 from the position showing the discharge duty of the nozzle No belonging to the base end (the upstream end in the conveyance direction) to the position showing the discharge duty of the defect nozzle $N_x$' is configured to let the discharge duties become 50% in the discharge step E1*a* and the discharge step E1*b*. Therefore, the discharge step E1*a* includes the part of the 50% discharge duty and the descending portion I1 from the peak (the flat portion F1) in the function to the position showing the discharge duty of the nozzle 11 positioned at the downstream end in the conveyance direction. Note that the discharge step E1*c* includes the ascending portion H1 from the position showing the discharge duty of the defect nozzle $N_x$' to the 50% discharge duty position.

As depicted in FIG. 11A, if the defect nozzles $N_x$' and $N_x$ belong respectively to the chevron portion A and the base portion B of the function, then the controller 9 provides peaks T1 and T2 in the function (the graph of the function) at upstream and downstream respectively in the conveyance direction with respect to the position showing the discharge duty of the defect nozzle $N_x$' belonging to the chevron portion A, and flattens the area from the position showing the discharge duty of the nozzle No belonging to the base end (the upstream end in the conveyance direction) to the position showing the discharge duty of the defect nozzle $N_x$ belonging to the base portion B (see FIG. 11B). In other words, the controller 9 changes the function determined on the basis of the image data (see FIG. 11A) into another function (see FIG. 11B). In particular, the first peak T1 is associated with a nozzle 11 between the defect nozzle $N_x$ and the defect nozzle $N_x$' in the conveyance direction, and the second peak T2 is associated with a nozzle 11 between the defect nozzle $N_x$ and the nozzle 11 positioned at the downstream end in the conveyance direction (that is, here, the nozzle 11 corresponding to the upstream end of the flat portion F in the conveyance direction in the chevron portion A in the unchanged function depicted in FIG. 11A). Then, a flat portion F0 with the 0% discharge duty is defined as the area from the position showing the discharge duty of the nozzle No belonging to the base end (the upstream end in the conveyance direction) to the position showing the discharge duty of the defect nozzle $N_x$ belonging to the base portion B; an ascending portion H1 is defined as the area from the position showing the discharge duty of the defect nozzle $N_x$ to the first peak T1; and a descending portion I1 is defined as the area from the first peak T1 to the position showing the discharge duty of the defect nozzle $N_x$'. An ascending portion H2 is defined as the area from the position showing the discharge duty of the defect nozzle $N_x$' to the second peak T2; a flat portion F2 with the 50% discharge duty is defined as the area of the flat portion F in the unchanged function depicted in FIG. 11A and the area having the same width as the flat portion F0 extending downstream in the conveyance direction from the downstream end of the flat portion F in the conveyance direction; and a descending portion I2 is defined as the area from the downstream end of the flat portion F2 in the conveyance direction to position showing the fifth predetermined discharge duty position (the position deviating from the first peak T1 downstream in the conveyance direction by two times a predetermined distance (a predetermined distance), to be referred to below as "fifth predetermined discharge duty position"). An ascending portion H3 is defined as the area from the fifth predetermined discharge duty position to the position showing the discharge duty of 50% (the position deviating from the defect nozzle $N_x$' downstream in the conveyance direction by two times a predetermined distance (a predetermined distance), to be referred to below as "50% discharge duty position"); and a descending portion 13 is defined as the area from the 50% discharge duty position to the position showing the discharge duty of the nozzle 11 positioned at the downstream end in the conveyance direction. In the discharge step E1*a*, the changed function (see FIG. 11B) includes part of the flat portion F2 with the 50% discharge duty, the descending portion I2 from the downstream end of the flat portion F2 in the conveyance direction to the fifth predetermined discharge duty position, the ascending portion H3 from the fifth predetermined discharge duty position to the 50% discharge duty position, and the descending portion 13 from the 50% discharge duty position to the position showing the discharge duty of the nozzle 11 positioned at the downstream end in the conveyance direction. In the discharge step E1*b*, the changed function includes the rest part of the flat portion F2 with the 50% discharge duty. In the discharge step E1*c*, the changed function includes the flat portion F0 with the 0% discharge duty from the position showing the discharge duty of the nozzle No belonging to the base end (the upstream end in the conveyance direction) to the position showing the discharge duty of the defect nozzle $N_x$ belonging to the base portion B, the ascending portion H1 from the position showing the discharge duty of the defect nozzle $N_x$ to the first peak T1, the descending portion I1 from the first peak T1 to the position showing the discharge duty of the defect nozzle $N_x$', and the ascending portion H2 from the position showing the discharge duty of the defect nozzle $N_x$' to the second peak T2. The changed function is configured such that the discharge duty of each nozzle 11 becomes 100% in the discharge steps E1*a* to E1*c* for the unit area of the paper P. In other words, the changed function is configured such that for each of the plurality of nozzles 11, the sum of the discharge duty value of the discharge step E1*a*, the discharge duty value of the discharge step E1*b*, and the discharge duty value of the discharge step E1*c* becomes 100%. Therefore, the discharge steps E1*a* to E1*c* maintain a complementary relationship. More specifically, in the changed function, the flattened area extends from the position showing the discharge duty of the nozzle No belonging to the base end (the upstream end in the conveyance direction) to the position showing the discharge duty of the defect nozzle $N_x$. Therefore, for the discharge duties to be 100% in sum, the portion corresponding to the area from the position showing the discharge duty of the nozzle No belonging to the base end (the upstream end in the conveyance direction) to the defect nozzle $N_x$ is configured to let the discharge duties become 50% in the discharge step E1*a* and the discharge step E1*b*. Further, the changed function in the discharge step E1*b* has the 50% discharge duty. Therefore, the discharge duties becomes 50% in the sum of the discharge duty shown by the descending portion I2 from the peak (the flat portion F2) of the function to the fifth predetermined discharge duty position in the discharge step E1*a*, and the discharge duty shown by the ascending portion H1 from the position showing the discharge duty of the defect nozzle $N_x$ to the first peak T1 in the discharge step E1*c*, for each of the corresponding plurality of nozzles 11. Further, the changed function in the discharge step E1*b* has the 50% discharge duty. Therefore, the changed function lets the discharge duties become 50% in sum of the discharge duty shown by the ascending portion H3 from the fifth predetermined discharge duty position to the 50% discharge duty position in the discharge step E1*a*, and the discharge duty shown by the descending portion I1 from the first peak T1 to the position showing the discharge duty of the defect nozzle $N_x$' in the discharge step E1*c*, for each of the corresponding plurality of nozzles 11. Further, the changed function has the 50% discharge duty in the discharge step E1*b*. Therefore, the changed function lets the discharge duties become 50% in sum of the discharge duty shown by the descending portion 13 from the 50% discharge duty position to the position showing the discharge duty of the nozzle 11 positioned at the downstream end in the conveyance direction in the discharge step E1*a*, and the ascending portion H2 from the position showing the discharge duty of the defect nozzle $N_x$' to the peak (the flat portion F2) of the function in the discharge step E1*c*, for each of the corresponding plurality of nozzles 11.

Returning to FIG. 3, after the step S4 or when determining that no defect nozzle is detected (step S3: No), then the controller 9 carries out the recording process (the conveyance process and the discharge process) (step S5). If the step S5 is carried out after the step S4, then the controller 9 carries out the conveyance process, and the discharge process based on the function changed in the step S4. If the step S5 is carried out with no defect nozzle detected (step S3: No), then the controller 9 carries out the conveyance process, and the discharge process based on the unchanged function.

After the step S5, the controller 9 ends the processing routine.

As described above, according to this embodiment, the controller 9 carries out the detection process to detect any defect nozzle $N_x$ (step S2) before carrying out the discharge process (step S5). If a defect nozzle $N_x$ is detected (step S3: Yes), then the function is changed (step S4). FIGS. 12A and 12B depict a referential example of the present disclosure. FIG. 12A is a graph similar to FIG. 4A, depicting the unchanged function when a recording is carried out by two moving operations to a unit area of a paper P. FIG. 12B is a graph depicting a raised discharge duty of another nozzle $N_y$, corresponding to the position of the defect nozzle $N_x$. According to this referential example, if the image is complemented by raising the discharge duty of another nozzle $N_y$, corresponding to the position of the defect nozzle $N_x$, then the other nozzle $N_y$ cannot complement the image if the conveying distance and/or the landing position deviate (s), such that dot absence (and furthermore a banding) may occur. In this respect, according to this embodiment, if a defect nozzle $N_x$ is detected, then the function is changed (see FIGS. 4A and 4B to 11A and 11B), without simply raising the discharge duty of another nozzle $N_y$, corresponding to the position of the defect nozzle $N_x$. By virtue of this, even if the conveying distance and/or the landing position deviate(s), it is still possible to prevent the dot absence due to the defect nozzle $N_x$.

Further, depending on whether the defect nozzle $N_x$ belonging to the chevron portion A or the base portion B of the function, in the change process (step S4), the controller 9 varies the function (see FIGS. 4A and 4B, 5A and 5B, 8A and 8B, and 9A and 9B). If the defect nozzle $N_x$ belongs to the chevron portion A of the function, and the area from the position showing the discharge duty of the nozzle No belonging to the base end (the upstream end in the conveyance direction) to the position showing the discharge duty of the defect nozzle $N_x$ is flatten, then the flatten area is long and thus the effect of preventing the image quality from deterioration owing to provided inclination is reduced. Further, when the defect nozzle $N_x$ belongs to the base portion B, if the peaks T1 and T2 are provided at the upstream side and the downstream side in the conveyance direction of the position showing the discharge duty of the defect nozzle $N_x$ respectively, then it is necessary to provide the peaks in a part which should have been flat, thereby resulting in a complicated process. For example, in a case that the defect nozzle $N_x$ belongs to the base portion B, if a peak is provided at the upstream side with respect to the position showing the discharge duty of the defect nozzle $N_x$, then a more complicated process occurs than the case of flattening the upstream part in the conveyance direction of the position showing the discharge duty of the defect nozzle $N_x$. In this respect, in this embodiment, by varying the function according to whether the defect nozzle $N_x$ belonging to the chevron portion A or the base portion B of the function, it is possible to prevent occurrence of the image quality deterioration and the process complication, such as mentioned above.

If the defect nozzle $N_x$ belongs to the chevron portion A as depicted in FIGS. 4A and 8A, then in the function, the controller 9 provides the peaks T1 and T2 at the upstream side and the downstream side in the conveyance direction of the position showing the discharge duty of the defect nozzle $N_x$ respectively (see FIGS. 4B and 8B) in the change process (step S4). In this case, the inclinations are provided to interpose the peak T1 at the upstream side and the downstream side in the conveyance direction of the peak T1 and the inclinations are provided to interpose the peak T2 at the upstream side and the downstream side in the conveyance direction of the peak T2, such that the effect of preventing the image quality from deterioration is obtained owing to those inclinations.

If the defect nozzle $N_x$ belongs to the base portion B as depicted in FIGS. 5A and 9A, then in the function, the controller 9 flattens the area from the position showing the discharge duty of the nozzle No belonging to the base end (the upstream end in the conveyance direction) to the position showing the discharge duty of the defect nozzle $N_x$ (see FIGS. 5B and 9B) in the change process (step S4). In this case, it is possible to prevent the process from complication compared to the case of providing the peaks.

If two defect nozzles $N_x$ and $N_x'$ belong to the base portion B as depicted in FIGS. 6A and 10A, then in the function, the controller 9 flattens the area from the position showing the discharge duty of the nozzle No belonging to the base end (the upstream end in the conveyance direction) to the position showing the discharge duty of the defect nozzle $N_x'$ closest to the chevron portion between the two defect nozzles $N_x$ and $N_x'$ (see FIGS. 6B and 10B) in the change process (step S4). In this case, it is possible to prevent the process from complication even when there are a plurality of defect nozzles $N_x$ and $N_x'$.

If two defect nozzles $N_x'$ and $N_x$ belong respectively to the chevron portion A and the base portion B of the function as depicted in FIGS. 7A and 11A, then in the function, the controller 9 provides the peaks T1 and T2 respectively at the upstream side and the downstream side in the conveyance direction of the position showing the discharge duty of the defect nozzle $N_x'$ belonging to the chevron portion A, and flattens the area from the position showing the discharge duty of the nozzle No belonging to the base end (the upstream end in the conveyance direction) to the position showing the discharge duty of the defect nozzle $N_x$ belonging to the base portion B (see FIGS. 7B and 11B), in the change process (step S4). In this case, it is possible to both prevent the image quality from deterioration and prevent the process from complication by combining the above methods if the defect nozzles $N_x$ and $N_x'$ belong respectively to the chevron portion A and the base portion B.

The discharge process includes a plurality of moving operations of discharging the ink from the nozzles 11 onto the paper P while the moving mechanism 3 is moving the head 1 in the moving direction. With the head of such a serial type, the singling method is used often and the effects of the present disclosure are exerted.

In the change process of the above embodiment (the step S4), the controller 9 changes the inclinations of the function (the graph of the function) at upstream and downstream respectively of the position showing the discharge duty of the defect nozzle $N_x$. The controller 9 may change the inclination of the function (the graph of the function) at upstream and/or downstream of the position showing the discharge duty of the defect nozzle $N_x$.

In the present specification and the present disclosure, the term "position (or area) of a certain nozzle in the function" refers to the position (or area) showing the discharge duty of that certain nozzle in the function (the function graph).

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

<Modifications>

Hereinabove, a preferred embodiment of the present disclosure was explained. However, the present disclosure is not limited to the above embodiment but can undergo various design changes without departing from the scope set forth in the appended claims.

For example, in the change process of the above embodiment (the step S4), regardless of whether the defect nozzle $N_x$ belonging to the chevron portion A or the base portion B, the function may be changed in an arbitrary manner.

The number of discharge steps for a unit area of the recording medium is two in FIGS. 4A and 4B to 7A and 7B, and three in FIGS. 8A and 8B to 11A and 11B. However, the number of discharge steps may be four or more.

The ascending portions H, H1, and H2, the descending portions I, I1, and I2, and the flat portions F0, F1, and F2 are linear in FIGS. 4A and 4B to 11A and 11B. However, they may have some ups and downs (undulation).

The discharge process may be carried out according either to a "two way" (forward way and backward way) moving operation or to a "one way" (either forward way or backward way) moving operation.

The head is of a serial type in the above embodiment. However, the head may be of a line type. Further, in the above embodiment, the liquid discharge apparatus includes one head where the nozzles are arrayed regularly. However, without being limited to that, a plurality of heads in each of which nozzles are arrayed regularly may be included. For example, the plurality of heads is arranged zigzag along an orthogonal direction orthogonal to the conveyance direction (the moving direction in FIG. 1), and let the nozzles overlap partially in the conveyance direction in two heads adjacent in the orthogonal direction. In this configuration, if a defect nozzle is detected, then in one of the two heads, the discharge duty of the nozzles in the area overlapping with the other of the two heads may be applied as the discharge duty of the discharge step E1*a* of FIG. 4B, whereas in the other of the two heads, the discharge duty of the nozzles in the area overlapping with the one of the two heads may be applied as the discharge duty of the discharge step E1*b* of FIG. 4B.

The liquid discharged from the nozzles is not limited to ink but may be, for example, another liquid than ink (such as a processing liquid agglutinating or depositing the ingredients of an ink or the like).

The recording medium is not limited to paper but may be, for example, cloth, a resin member, or the like.

The present disclosure is not limited to applying to printers but can also apply to facsimile devices, photocopy devices, multifunctional devices, and the like. Further, the present disclosure can also apply to liquid discharge apparatuses used for other purposes than recording images (such as liquid discharge apparatuses forming an electrically conductive pattern on a substrate by discharging an electrically conductive liquid).

The programs according to the present disclosure can be distributed either by way of recording the same into a removable recording medium such as a flexible disk or the like, or a non-removable recording medium, or by way of using a communication line.

What is claimed is:

1. A liquid discharge apparatus comprising:

a head having a plurality of nozzles;

a conveyer configured to convey a recording medium in a conveyance direction; and a controller, wherein:

the plurality of nozzles is distanced from each other in the conveyance direction;

the controller is configured to carry out, based on an image data, a conveyance process of conveying the recording medium in the conveyance direction by the conveyer, and a discharge process of discharging a liquid from the plurality of nozzles to the recording medium;

the discharge process includes a plurality of discharge steps to be carried out to a unit area of the recording medium with a time interval to discharge the liquid selectively from the plurality of nozzles based on data obtained by decomposing the image data into complementary patterns;

in at least one of the plurality of discharge steps corresponding to the unit area, a function of a discharge duty of the nozzles with respect to positions of the nozzles in the conveyance direction has an ascending portion gradually increasing from upstream to downstream in the conveyance direction or a descending portion gradually decreasing from upstream to downstream in the conveyance direction;

in an area including a plurality of pieces of the unit area adjacent to each other in the conveyance direction, the function is composed at least of the ascending portion and the descending portion; and the controller is configured to carry out before carrying out the discharge process:

a detection process of detecting a defect nozzle in the plurality of nozzles; and in a case that the defect nozzle is detected in the detection process, a change process of changing the function.

2. The liquid discharge apparatus according to claim 1, wherein the controller is configured to change, in the change process, an inclination of the function at upstream and/or downstream of the defect nozzle in the conveyance direction.

3. The liquid discharge apparatus according to claim 2, wherein changing the inclination of the function includes providing a peak at each of upstream and downstream of the defect nozzle in the conveyance direction, or flattening an area from a nozzle belonging to a base end to the defect nozzle.

4. The liquid discharge apparatus according to claim 1, wherein the controller is configured to vary, in the change process, the function depending on whether the defect nozzle belongs to a chevron portion of the function or a base portion of the function.

5. The liquid discharge apparatus according to claim 4, wherein in a case that the defect nozzle belongs to the chevron portion, the controller is configured to provide, in the change process, a peak in the function at each of upstream and downstream of the defect nozzle in the conveyance direction.

6. The liquid discharge apparatus according to claim 4, wherein in a case that the defect nozzle belongs to the base portion, the controller is configured to flatten, in the change process, an area in the function from a nozzle belonging to a base end to the defect nozzle.

7. The liquid discharge apparatus according to claim 6, wherein in a case that the defect nozzle is a plurality of defect nozzles belonging to the base portion, the controller is configured to flatten, in the change process, an area in the function from the nozzle belonging to the base end to the defect nozzle closest to the chevron portion among the plurality of defect nozzles.

8. The liquid discharge apparatus according to claim 4, wherein in a case that the defect nozzle includes a first defect nozzle belonging to the chevron portion and a second defect nozzle belonging to the base portion, the controller is configured to provide, in the change process, a peak in the function at each of upstream and downstream in the conveyance direction of the first defect nozzle belonging to the chevron portion, and to flatten, in the change process, an area from a nozzle belonging to a base end to the second defect nozzle belonging to the base portion.

9. The liquid discharge apparatus according to claim 1, further comprising a carriage configured to move the head in a moving direction orthogonal to the conveyance direction, wherein:

the discharge process includes carrying out a moving operation of discharging the liquid from the plurality of nozzles to the recording medium while moving the head in the moving direction by the carriage, for a plurality of times; and the controller is configured to alternately carry out, based on the image data, the conveyance process of conveying the recording medium through a predetermined amount by the conveyer in the conveyance direction, and the moving operation; and the moving operation corresponds to one of the plurality of discharge steps.

10. A control method for controlling a liquid discharge apparatus including a head having a plurality of nozzles, and a conveyer configured to convey a recording medium in a conveyance direction, the plurality of nozzles being distanced from each other in the conveyance direction, the control method comprising:

conveying the recording medium in the conveyance direction by the conveyer based on an image data; and discharging a liquid to the recording medium from the plurality of nozzles based on the image data, wherein:

the discharging of the liquid includes a plurality of discharge steps to be carried out to a unit area of the recording medium with a time interval to discharge the liquid selectively from the plurality of nozzles based on data obtained by decomposing the image data into complementary patterns;

in at least one of the plurality of discharge steps corresponding to the unit area, a function of a discharge duty of the nozzles with respect to positions of the nozzles in the conveyance direction has an ascending portion gradually increasing from upstream to downstream in the conveyance direction or a descending portion gradually decreasing from upstream to downstream in the conveyance direction; and in an area including a plurality of pieces of the unit area adjacent to each other in the conveyance direction, the function is composed at least of the ascending portion and the descending portion, the control method further comprising:

detecting a defect nozzle in the plurality of nozzles, before the discharging of the liquid; and in a case that the defect nozzle is detected in the detecting of the defect nozzle, changing the function before the discharging of the liquid.

11. The control method according to claim 10, wherein the changing of the function includes changing an inclination of the function at upstream and/or downstream of the defect nozzle in the conveyance direction.

12. The control method according to claim 11, wherein the changing of the inclination of the function includes providing a peak at each of upstream and downstream of the defect nozzle in the conveyance direction, or flattening an area from a nozzle belonging to a base end to the defect nozzle.

13. The control method according to claim 10, wherein the changing of the function includes varying the function depending on whether the defect nozzle belongs to a chevron portion of the function or a base portion of the function.

14. A non-transitory and computer readable medium storing a program capable of being executed by a controller of a liquid discharge apparatus, the liquid discharge apparatus including a head having a plurality of nozzles, and a conveyer configured to convey a recording medium in a conveyance direction, the plurality of nozzles being distanced from each other in the conveyance direction, the program being configured to cause the controller to carry out based on an image data:

a conveyance process of conveying the recording medium in the conveyance direction by the conveyer; and a discharge process of discharging a liquid from the plurality of nozzles to the recording medium, wherein:

the discharge process includes a plurality of discharge steps to be carried out to a unit area of the recording medium with a time interval to discharge the liquid selectively from the plurality of nozzles based on data obtained by decomposing the image data into complementary patterns;

in at least one of the plurality of discharge steps corresponding to the unit area, a function of a discharge duty of the nozzles with respect to positions of the nozzles in the conveyance direction has an ascending portion gradually increasing from upstream to downstream in the conveyance direction or a descending portion gradually decreasing from upstream to downstream in the conveyance direction; and in an area including a plurality of pieces of the unit area adjacent to each other in the conveyance direction, the function is composed at least of the ascending portion and the descending portion, the program is further configured to cause the controller to carry out before carrying out the discharge process:

a detection process of detecting a defect nozzle in the plurality of nozzles; and in a case that the defect nozzle is detected in the detection process, a change process of changing the function.

15. The computer readable medium according to claim 14, wherein the change process includes changing an inclination of the function at upstream and/or downstream of the defect nozzle in the conveyance direction.

16. The computer readable medium according to claim 15, wherein changing the inclination of the function includes providing a peak at each of upstream and downstream of the defect nozzle in the conveyance direction, or flattening an area from a nozzle belonging to a base end to the defect nozzle.

17. The computer readable medium according to claim 14, wherein the change process includes varying the function depending on whether the defect nozzle belongs to a chevron portion of the function or a base portion of the function.

* * * * *